United States Patent
Heasman et al.

(10) Patent No.: US 10,430,065 B2
(45) Date of Patent: Oct. 1, 2019

(54) PINABLE AND ACTIONABLE NAVIGATION BREADCRUMBS

(71) Applicant: ADP, LLC, Roseland, NJ (US)

(72) Inventors: Nick Heasman, New York, NY (US); Michael Morgan, New York, NY (US)

(73) Assignee: ADP, LLC, Roseland, NJ (US)

(*) Notice: Subject to any disclaimer, the term of this patent is extended or adjusted under 35 U.S.C. 154(b) by 434 days.

(21) Appl. No.: 14/849,934

(22) Filed: Sep. 10, 2015

(65) Prior Publication Data

US 2017/0075535 A1    Mar. 16, 2017

(51) Int. Cl.
*G06F 3/0484* (2013.01)
*G06F 3/0486* (2013.01)
*G06F 3/0481* (2013.01)

(52) U.S. Cl.
CPC .......... *G06F 3/0486* (2013.01); *G06F 3/0481* (2013.01); *G06F 3/04842* (2013.01); *G06F 3/04817* (2013.01); *G06F 2203/04803* (2013.01)

(58) Field of Classification Search
CPC ............. G06F 17/30884; G06F 17/241; G06F 17/30885; G06F 3/0486; G06F 3/0481; G06F 3/04842; G06F 17/30861; H04L 67/02
See application file for complete search history.

(56) References Cited

U.S. PATENT DOCUMENTS

| | | |
|---|---|---|
| 6,141,010 A | 10/2000 | Hoyle |
| 8,533,199 B2 | 9/2013 | Malla |
| 2003/0177265 A1 | 9/2003 | Page et al. |
| 2008/0320403 A1* | 12/2008 | Glaberson ........... G06F 3/04817 715/763 |
| 2010/0083158 A1* | 4/2010 | Adler .................. G06F 17/3089 715/771 |
| 2010/0138757 A1* | 6/2010 | Shigenobu ......... H04N 1/00411 715/760 |
| 2010/0162168 A1* | 6/2010 | Lee ...................... G06Q 10/107 715/821 |
| 2010/0332280 A1 | 12/2010 | Bradley et al. |
| 2011/0106637 A1* | 5/2011 | Goto ...................... G06Q 30/02 705/14.73 |
| 2011/0276889 A1* | 11/2011 | Boshernitzan ........ G06F 3/0486 715/738 |

(Continued)

FOREIGN PATENT DOCUMENTS

WO    WO2001071491 A2    9/2011

OTHER PUBLICATIONS

"Manage Bookmarks—Chrome Help," https://support.google.com/chrome/answer/188842?hl=en, accessed Jul. 20, 2015, 2 pages.

(Continued)

*Primary Examiner* — Rinna Yi
(74) *Attorney, Agent, or Firm* — Yee & Associates, P.C.

(57) ABSTRACT

A method implemented by a computer. The method includes displaying, on a tangible display device, a pinboard including a first breadcrumb; receiving input from a user, via a tangible user input device, commanding that an action be taken with respect to the breadcrumb, the action being other than navigating to where the breadcrumb points; and performing the action, wherein the action enables faster operation of the computer by avoidance of intervening user actions.

13 Claims, 18 Drawing Sheets

(56) References Cited

U.S. PATENT DOCUMENTS

| | | |
|---|---|---|
| 2012/0060115 A1 | 3/2012 | Han et al. |
| 2015/0261394 A1* | 9/2015 | Shah ..................... G06F 3/0482 715/826 |
| 2015/0324086 A1* | 11/2015 | Sakamoto ............. G06F 3/0488 345/173 |
| 2015/0347987 A1 | 12/2015 | Ali |
| 2017/0075542 A1 | 3/2017 | Heasman et al. |
| 2017/0116333 A1 | 4/2017 | Hailpern et al. |

OTHER PUBLICATIONS

Office Action, dated Nov. 30, 2017, regarding U.S. Appl. No. 14/850,043, 14 pages.

Office Action, dated Jan. 14, 2019, regarding U.S. Appl. No. 14/850,043, 17 pages.

Final Office Action, dated May 31, 2018, regarding U.S. Appl. No. 14/850,043, 15 pages.

\* cited by examiner

PINABLE AND ACTIONABLE NAVIGATION BREADCRUMBS

This application is related to ES2015028-2, filed Sep. 10, 2015.

BACKGROUND INFORMATION

1. Field

The present disclosure relates to methods and devices for creating special purpose computers whose hardware and programming enable dynamic and efficient data retrieval when navigating hyperlinks.

2. Background

Breadcrumbs are a navigation aid used in user interfaces. Breadcrumbs allow users to keep track of their locations within programs or documents. In the case of a Web browser, for instance, breadcrumbs are navigation shortcuts of prior websites a user visited. In this case, breadcrumbs may appear as icons on a ribbon located within the browser window. A user may return to a previously visited website by clicking on one of these icons, also known as breadcrumbs. However, breadcrumbs are not limited to Web browsing, and may be present in the user interfaces of other types programs and, perhaps, also in documents.

SUMMARY

The illustrative embodiments provide for a method implemented by a computer. The method includes displaying, on a tangible display device, a pinboard including a first breadcrumb; receiving input from a user, via a tangible user input device, commanding that an action be taken with respect to the breadcrumb, the action being other than navigating to where the breadcrumb points; and performing the action, wherein the action enables faster operation of the computer by avoidance of intervening user actions.

The illustrative embodiments also provide for a computer. The computer includes a processor, a non-transitory computer readable storage medium in communication with the processor, a display device in communication with the processor, a tangible user input device in communication with the processor, and electronics in communication with the processor. The electronics is physically configured to order the processor to display, on a tangible display device, a pinboard including a first breadcrumb, receive input from a user, via the tangible user input device, that commands that an action be taken with respect to the breadcrumb, the action being other than navigating to where the breadcrumb points, and perform the action, wherein the action enables faster operation of the computer by avoidance of intervening user actions.

The illustrative embodiments also provide for a non-transitory computer readable storage medium storing computer usable program code which, when executed by a processor, performs a method implemented by a computer. The computer usable program code includes computer usable program code for displaying, on a tangible display device, a pinboard including a first breadcrumb. The computer usable program code also includes computer usable program code for receiving input from a user, via a tangible user input device, commanding that an action be taken with respect to the breadcrumb, the action being other than navigating to where the breadcrumb points. The computer usable program code also includes computer usable program code for performing the action. The action enables faster operation of the computer by avoidance of intervening user actions.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account that breadcrumbs are navigation shortcuts of prior locations a user visited, but that breadcrumbs have limited functionality. Thus, the illustrative embodiments provide for dynamic breadcrumbs that are movable breadcrumbs, such as by dragging and dropping. Thus, the illustrative embodiments provide for a pinboard. A pinboard is defined as an area on a display where breadcrumbs are collected and/or organized. Thus, a pinboard may be thought of as a collection of locations a user is interested in. A user can have multiple pinboards from a pinboard icon dropdown, covering different categories of locations. A breadcrumb can be dragged to a pinboard.

The illustrative embodiments also recognize and take into account that breadcrumbs may be given additional functionality. For example, a breadcrumb can also have a list of dropdown actions associated with it, allowing a user to take actions on the breadcrumb, rather than having to navigate back to the particular location to take an action.

Figure 1:
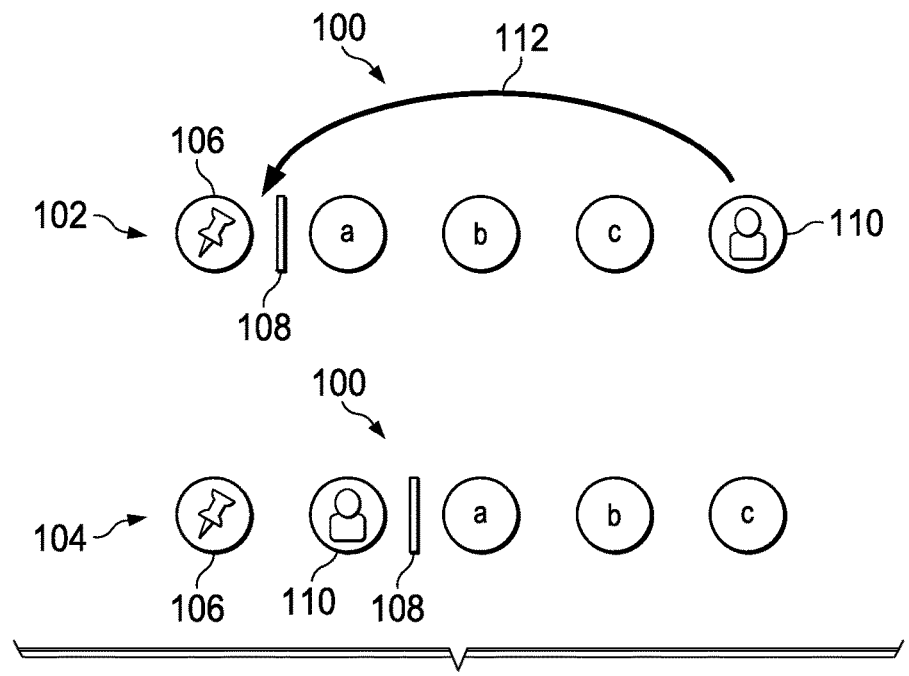
FIG. 1 is an illustration of manipulation of breadcrumbs on a pinboard, in accordance with an illustrative embodiment.

FIG. 1 is an illustration of manipulation of breadcrumbs on a pinboard, in accordance with an illustrative embodiment. Pinboard 100 and its breadcrumbs may be implemented and displayed using a computer and display system, such as data processing system 2200 of FIG. 22. Note that two instances of pinboard 100 are shown at two different points in time, with row 102 representing a first time and row 104 representing a second time. FIG. 1 illustrates one method of manipulating breadcrumbs on pinboard 100.

Pinboard 100 includes pin icon 106 and separation bar 108. Breadcrumbs on one side of separation bar 108, such as to the right of separation bar 108, are breadcrumbs that automatically change over time as a user or the data processing system creates breadcrumbs over time. Breadcrumbs to the other side of separation bar 108, such as to the left of separation bar 108, are breadcrumbs that the user desires to be permanently pinned and readily usable. In an illustrative embodiment, these breadcrumbs do not change unless a user requests such a change.

For example, in row 102, pinboard 100 includes breadcrumb 110 which the user wishes to frequently access. As shown by arrow 112, the user may use an input device to drag or otherwise move breadcrumb 110 to the other side of separation bar 108. Row 104 shows a result of taking this action on pinboard 100.

Figure 2:
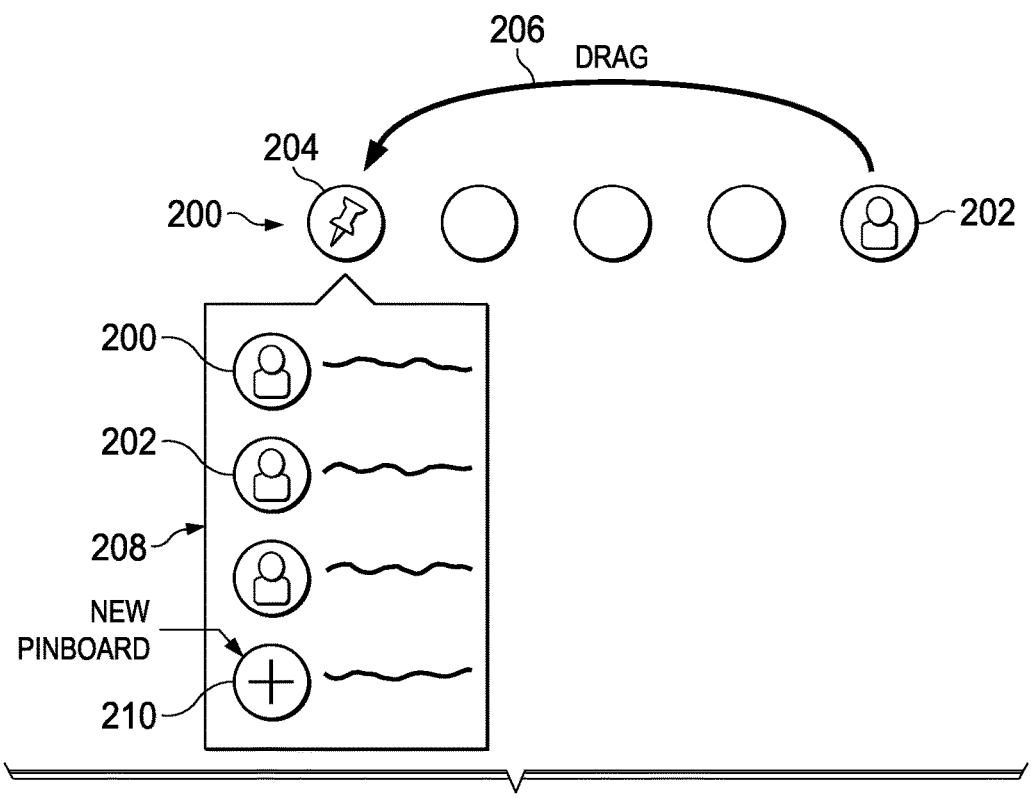
FIG. 2 is another illustration of manipulation of breadcrumbs on a pinboard, in accordance with an illustrative embodiment.

FIG. 2 is another illustration of manipulation of breadcrumbs on a pinboard, in accordance with an illustrative embodiment. Pinboard 200 and its breadcrumbs may be implemented and displayed using a computer and display system, such as data processing system 2200 of FIG. 16. Pinboard 200 may be a variation of pinboard 100 of FIG. 1.

In this illustrative embodiment, multiple pinboards may be maintained, managed, and displayed. For example, a user may note that next to pinboard 200 is pinboard 202, which is represented as a breadcrumb but is actually a collapsed pinboard as indicated by the icon of a person inside the circle shown in FIG. 2. In other words, a pinboard could show both breadcrumbs and other pinboards represented as breadcrumbs.

In this example, the user drags or otherwise moves an icon representing pinboard 202 to pin icon 204, as represented by arrow 206. As a result, the data processing system may cause pop-up window 208 to appear. Pop-up window 208 may display a list of different pinboards, which now includes pinboard 202, as well as pinboard 200. If a user subsequently selects one of the pinboards in pop-up window 208, then the breadcrumbs displayed to the right of pin icon 204 will change to the selected pinboard. Optionally, a user may select expansion button 210 to either create a new pinboard or to expand the selection of pinboards shown in pop-up window 208.

This illustrative embodiment may be further varied. For example, pop-up window 208 may display individual breadcrumbs, possibly together with one or more pinboards. Pop-up window 208 may take some other form, such as a permanently displayed screen or some other graphical user interface with which a user may interact.

Figure 3:
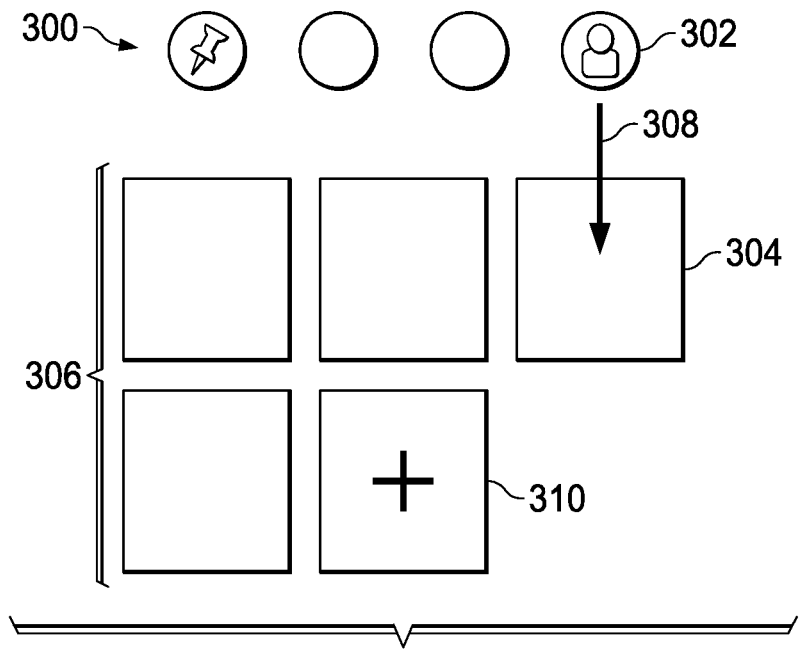
FIG. 3 is another illustration of manipulation of breadcrumbs on a pinboard, in accordance with an illustrative embodiment.

FIG. 3 is another illustration of manipulation of breadcrumbs on a pinboard, in accordance with an illustrative embodiment. Pinboard 300 and its breadcrumbs may be implemented and displayed using a computer and display system, such as data processing system 2200 of FIG. 22. Pinboard 300 may be a variation of pinboard manipulation, as shown in FIG. 2.

In this illustrative embodiment, breadcrumb 302 in pinboard 300 is dragged or otherwise moved to second pinboard 304 in group of pinboards 306, as shown by arrow 308. In this manner, a user may associate a breadcrumb, such as breadcrumb 302, with a different pinboard. In this same manner, breadcrumb 302 may be moved to other pinboards such that a single breadcrumb appears in multiple pinboards simultaneously.

In addition, group of pinboards 306 may be associated with adder icon 310. Adder icon 310 may be selected to create a new pinboard into which breadcrumbs may be dragged or otherwise added.

Figure 4:
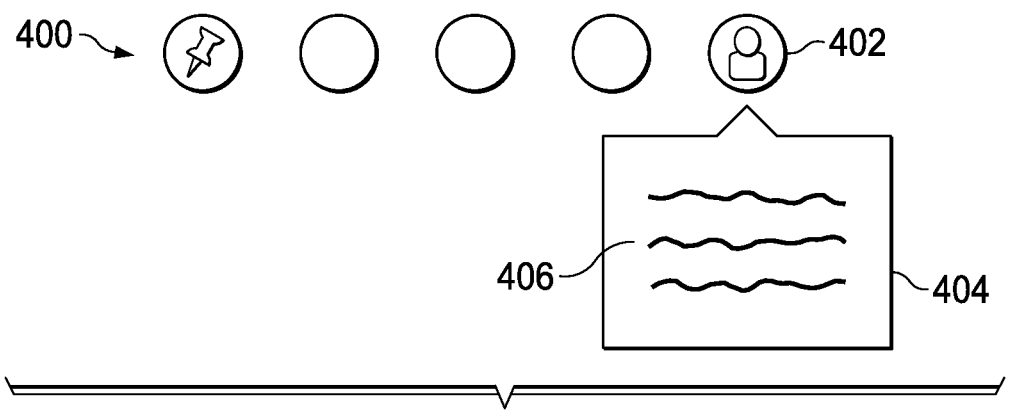
FIG. 4 is another illustration of manipulation of breadcrumbs on a pinboard, in accordance with an illustrative embodiment.

FIG. 4 is another illustration of manipulation of breadcrumbs on a pinboard, in accordance with an illustrative embodiment. Pinboard 400 and its breadcrumbs may be implemented and displayed using a computer and display system, such as data processing system 2200 of FIG. 22. Pinboard 400 may be a variation of breadcrumb manipulation on a pinboard, as shown in FIG. 1.

In this illustrative embodiment, additional capabilities are provided to the breadcrumbs in order to increase the speed at which the computer is able to process commands provided by a user. For example, breadcrumb 402 may be selected, in response to which pop-up window 404 may be displayed. Pop-up window 404 may, in turn, display one or more commands 406 which may be performed with respect to breadcrumb 402, or one or more commands which may be performed with respect to the underlying data or function to which breadcrumb 402 points.

For example, commands 406 may be commands to manipulate breadcrumb 402, such as, for example, to remove, edit, or highlight, or perhaps, move the breadcrumb to another pinboard.

In another example, commands 406 may be one or more commands directing an action be taken with respect to underlying data to which breadcrumb 402 points. In a specific example, breadcrumb 402 may point to a link which, when selected, displays human resources data regarding a particular person. In this case, commands 406 may be to indicate that the person is to receive an automatic pay raise, is to be evaluated, is to have an evaluation reviewed by management, or to update one or more aspects of profile describing the person. "Profile data" is information about a person, such as name, age, sex, account number, assigned department, or any other information.

In this particular example, the action may be taken faster relative to conventional pinboards and breadcrumbs. In a conventional pinboard and breadcrumb arrangement, a user would select a breadcrumb. In response, the user would be directed to a web page or dashboard to which that breadcrumb is linked. The user could then take actions on that web page or dashboard. However, using the illustrative embodiments, the user may instead use pop-up window 404 to directly issue commands that ordinarily could only be accessed via the web page or dashboard, but without having to actually navigate to and display the web page or dashboard. As a result, the computer may operate more quickly than with conventional pinboard and breadcrumb systems.

Commands 406 may take many different forms. More generally, commands 406 may be any commands or actions that may be taken with respect to either breadcrumb 402 itself, or the data or software to which breadcrumb 402 is linked. Thus, the illustrative embodiments are not limited to the human resources example described above.

More generally, the action may be any action that the user wishes to take with respect to the breadcrumb or the underlying data or functionality to which the breadcrumb points. In another non-limiting example, the illustrative embodiments contemplate that the action may be to delete, hide, or remove a breadcrumb. In a more specific example, this type of action may be accomplished by dragging the breadcrumb away and off the pinboard. In another more specific example, this type of action may be accomplished by right-clicking on the breadcrumb using a mouse, and then selecting an option to delete, hide, or remove the breadcrumb from the pinboard. The illustrative embodiments contemplate many other types of actions. The examples described above with respect to one or more breadcrumbs and/or one or more pinboards are examples of pinable and actionable navigation breadcrumbs.

FIG. 5 through FIG. 11 refer to a specific example of use of the illustrative pinboards and breadcrumbs in the context of a human resources program. Thus, FIG. 5 through FIG. 11 further the specific example described in FIG. 4. For this reason, FIG. 5 through FIG. 11 share similar reference numerals. For all of FIG. 5 through FIG. 11, dashboard 500, pinboard 502, and breadcrumbs 504 may all be implemented and displayed using a computer and display system, such as data processing system 2200 of FIG. 22. Breadcrumbs 504 may include breadcrumb 508 and breadcrumb 510, which are described further below. Pin icon 506 is also shown and described further below. Other alternative uses and examples for the pinboards and breadcrumbs of the illustrative embodiments may exist; thus, the examples shown in FIG. 5 through FIG. 11 do not necessarily limit the claimed inventions.

Figure 5:
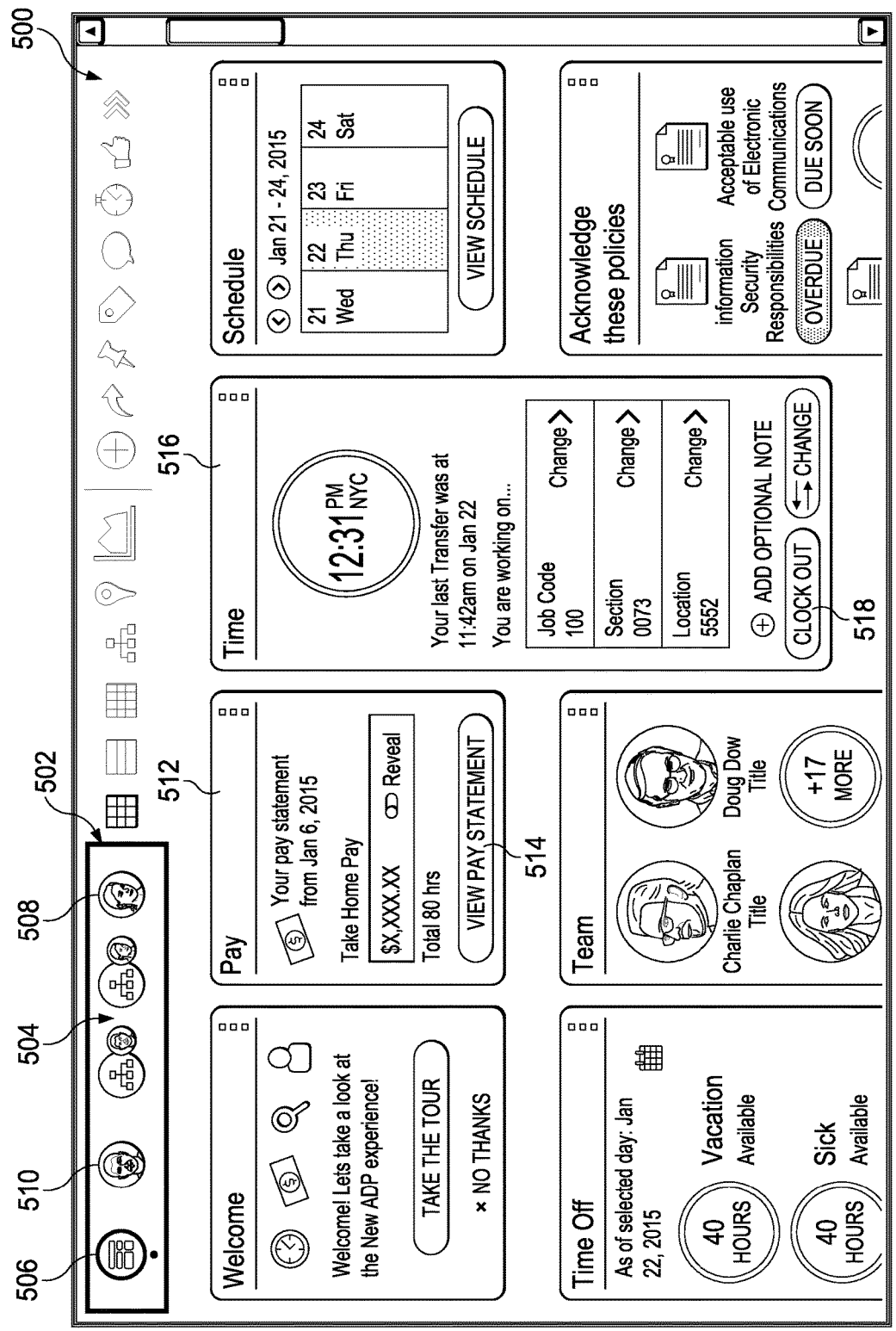
FIG. 5 is a drawing of a pinboard used in conjunction with a dashboard, in accordance with an illustrative embodiment.

FIG. 5 is a drawing of a pinboard used in conjunction with a dashboard, in accordance with an illustrative embodiment. Dashboard 500 includes pinboard 502 of breadcrumbs 504, which may be an example of any of the pinboards and breadcrumbs described with respect to FIG. 1 through FIG. 4. Thus, for example, pin icon 506 could be pin icon 106 of FIG. 1.

Dashboard 500 shows several display areas which serve different functions. Some display areas, such as display area 512, show only information or data, which perhaps could be expanded by selection of exemplary expansion button 514. Other display areas, such as display area 516 may reference applications or functions which may take action, in addition to displaying information. For example, display area 516 includes "clock out" button 518, which may be a function or a command to another software application to indicate that paid time should no longer be tracked for a particular employee.

Figure 6:
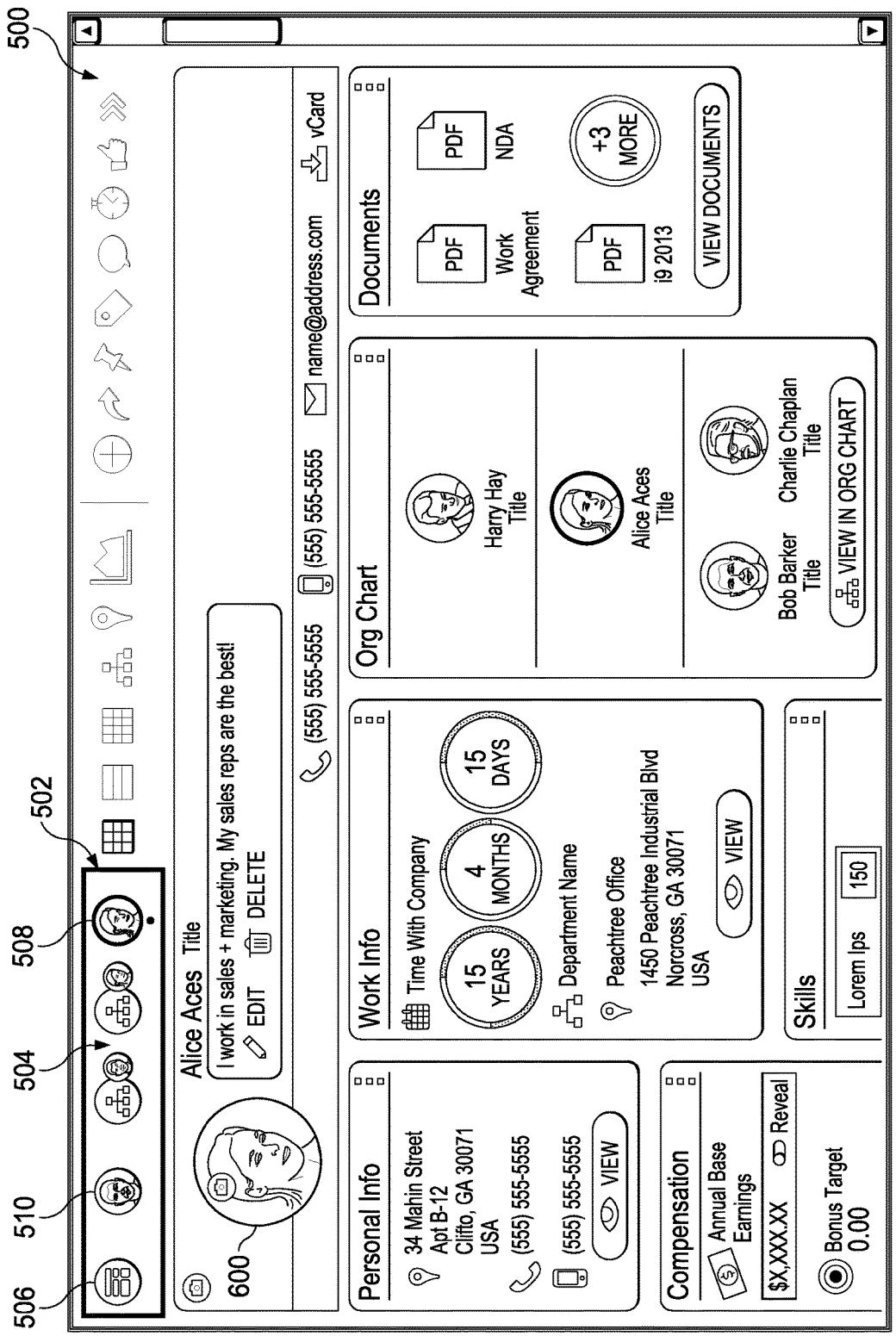
FIG. 6 is another drawing of a pinboard used in conjunction with a dashboard, in accordance with an illustrative embodiment.
Figure 7:
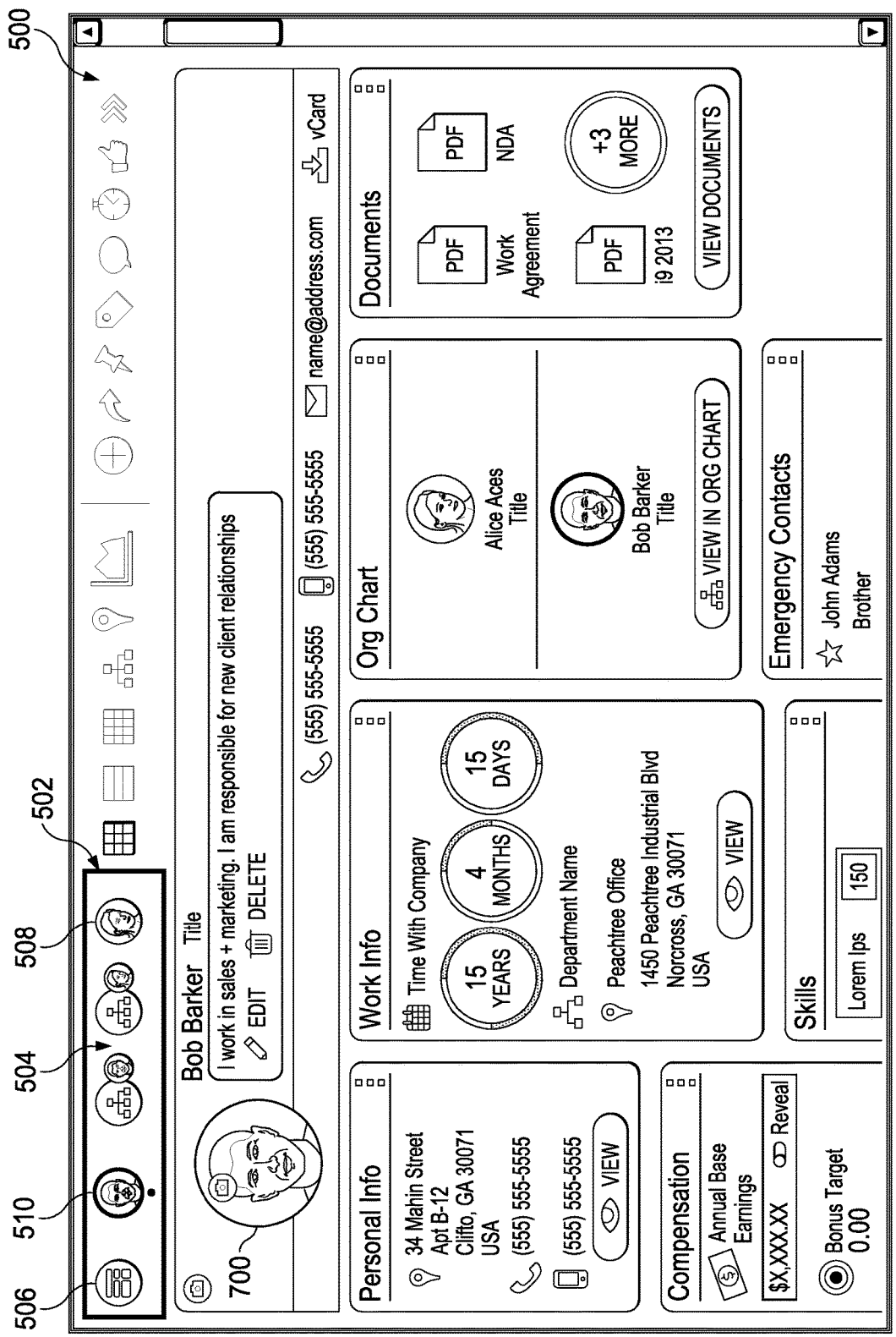
FIG. 7 is another drawing of a pinboard used in conjunction with a dashboard, in accordance with an illustrative embodiment.

FIG. 6 is another drawing of a pinboard used in conjunction with a dashboard, in accordance with an illustrative embodiment. In FIG. 6, a user has selected breadcrumb 508. Breadcrumb 508 is a link to a first set of dashboard pages associated with woman 600. As a result, a different set of display areas is shown in FIG. 6. FIG. 7 is another drawing of a pinboard used in conjunction with a dashboard, in accordance with an illustrative embodiment. In FIG. 7, a user has selected breadcrumb 510. Breadcrumb 510 is a link to a second set of dashboard pages associated with man 700. As a result, a still different set of display areas is shown in FIG. 7, relative to FIG. 6.

Figure 8:
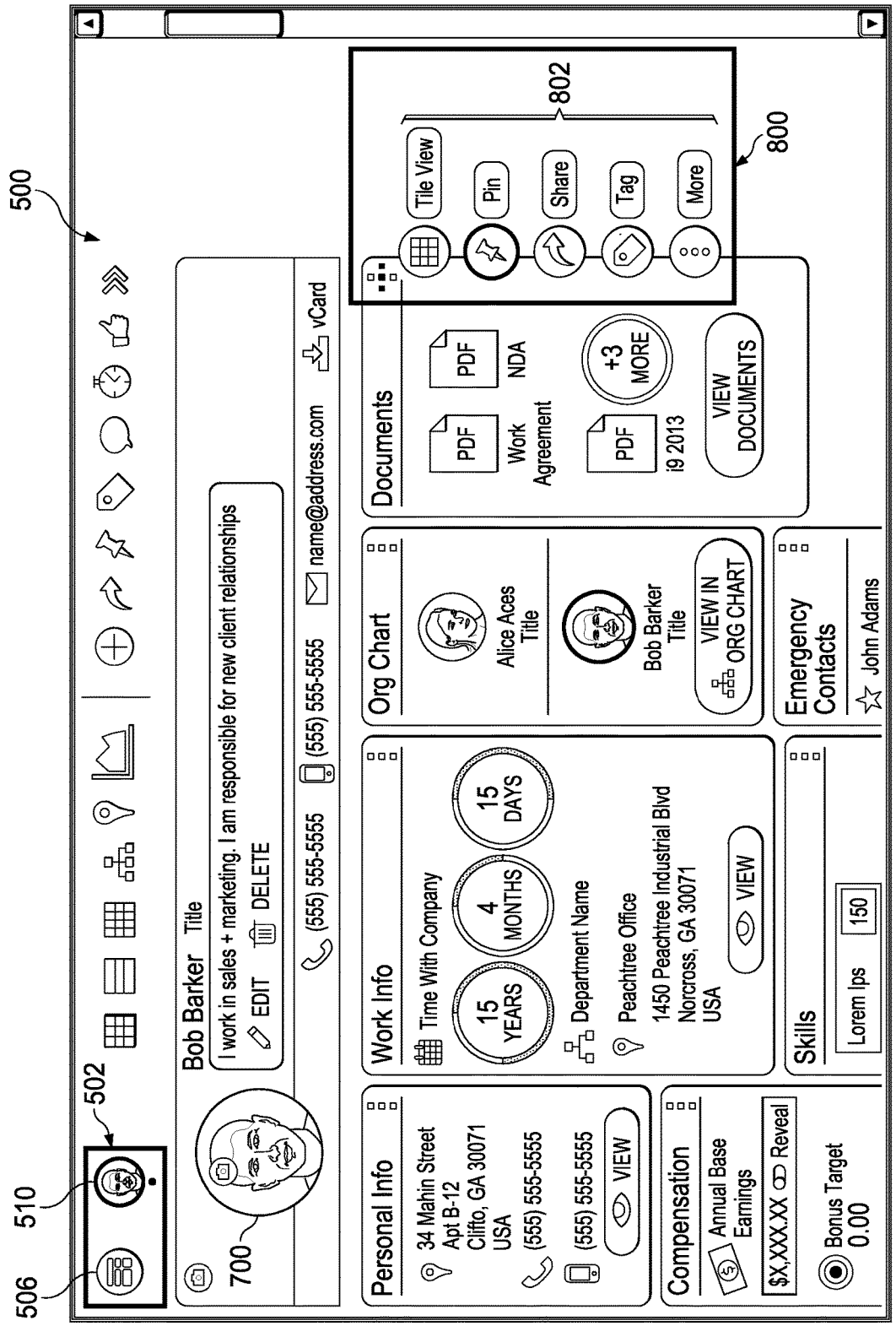
FIG. 8 is another drawing of a pinboard used in conjunction with a dashboard, in accordance with an illustrative embodiment.

FIG. 8 is another drawing of a pinboard used in conjunction with a dashboard, in accordance with an illustrative embodiment. In FIG. 8, a user is manipulating breadcrumb 510 to associate breadcrumb 510 (which refers to the second set of pages relating to man 700) with a different pinboard. For example, a user could have selected breadcrumb 510, perhaps by using a "right-click" function of a mouse input device (though other input means are possible). As a result, pop-up window 800 is displayed.

Pop-up window 800 includes commands 802. In this illustrative example, commands 802 include "tile view", "pin", "share", "tag", and "more." By selecting "tile view" a user may return to dashboard 500 shown in FIG. 8. By selecting "pin" the user may pin this breadcrumb to one or more pinboards. By selecting "share," the user may share the breadcrumb with another user, presumably using the same or similar human resources software. By selecting "tag" the user may highlight or set a note to himself or herself, or perhaps to another person, that attention is needed with respect to this second set of dashboard pages associated with man 700. By selecting "more" a user may prompt the computer to display additional actions that may be taken with respect to breadcrumb 510 or additional actions that may be taken with respect to the data or software to which breadcrumb 510 points.

Figure 9:
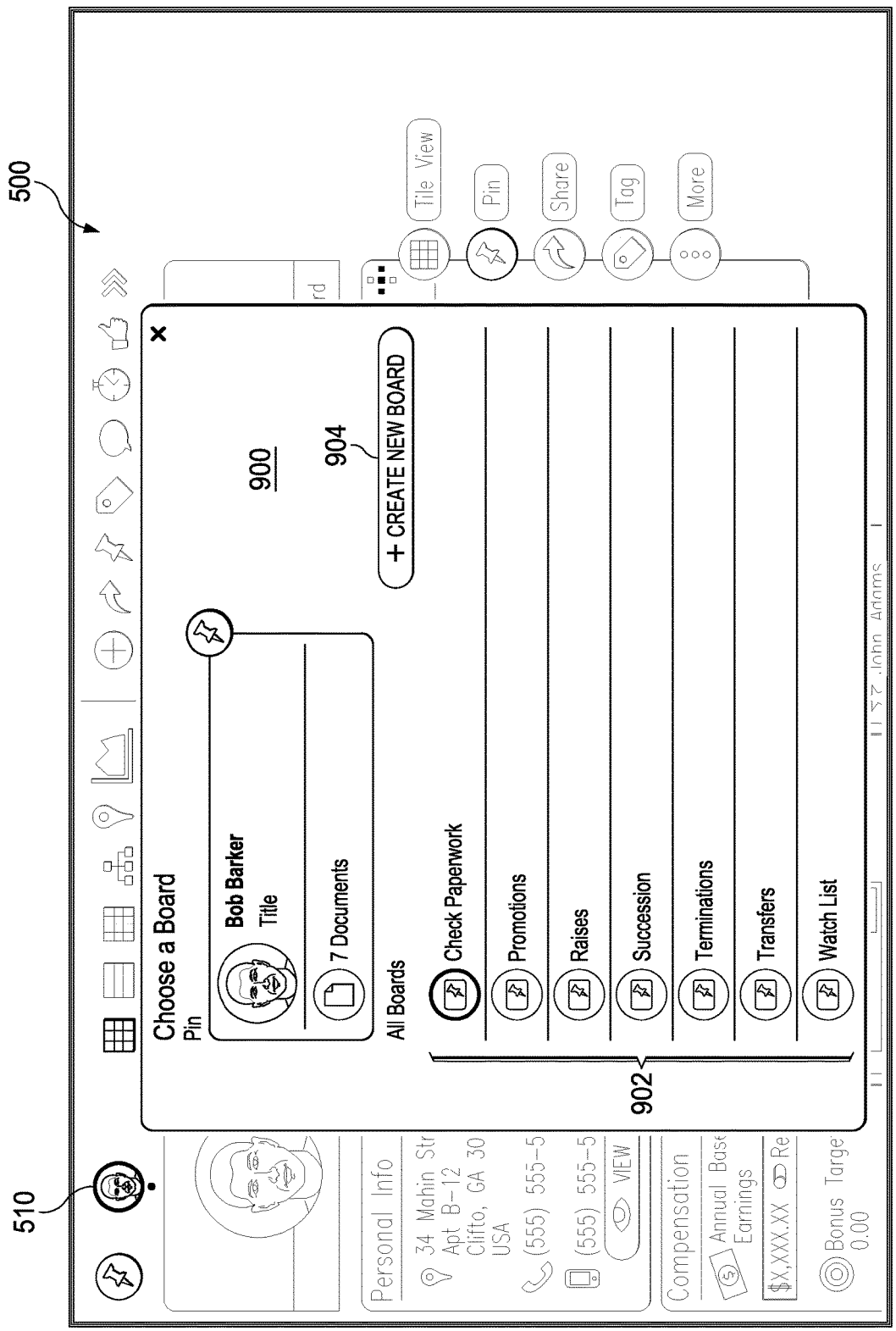
FIG. 9 is another drawing of a pinboard used in conjunction with a dashboard, in accordance with an illustrative embodiment.

FIG. 9 is another drawing of a pinboard used in conjunction with a dashboard, in accordance with an illustrative embodiment. FIG. 9 shows second pop-up window 900, which is displayed when the user selected "pin" in commands 802 of pop-up window 800 of FIG. 8. Second pop-up window 900 displays a set of pinboards 902 to which breadcrumb 510 may be associated. The user may select one or more of the pinboards shown in pinboards 902. In this illustrative embodiment, the user selected "check paperwork." Thus, breadcrumb 510 will now be associated with the pinboard known as "check paperwork."

Other commands or functions may also be present in second pop-up window 900, such as, for example, "create new board" button 904. A user may actuate this button to create a new pinboard with which the user would like to associate breadcrumb 510.

Figure 10:
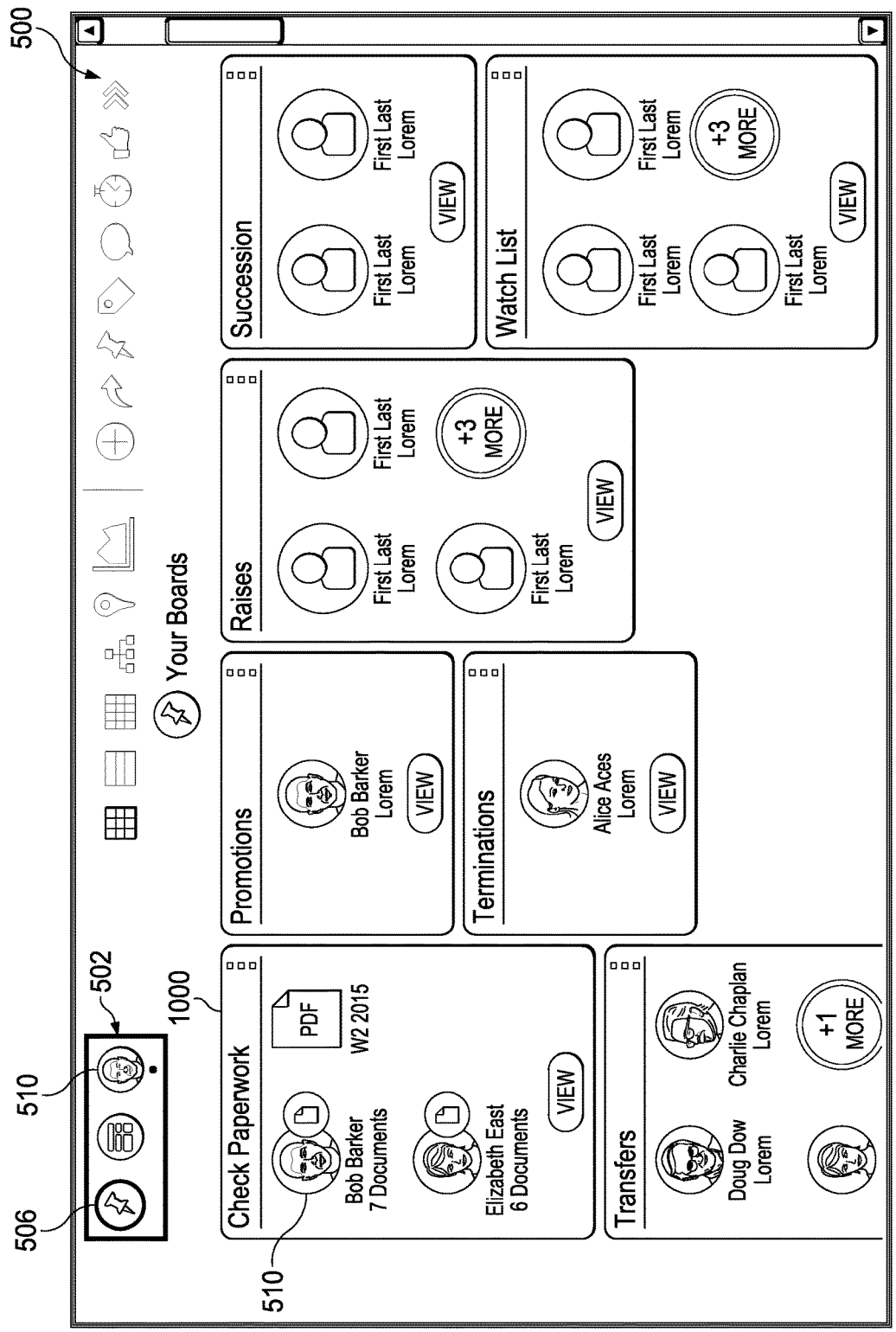
FIG. 10 is another drawing of a pinboard used in conjunction with a dashboard, in accordance with an illustrative embodiment.

FIG. 10 is another drawing of a pinboard used in conjunction with a dashboard, in accordance with an illustrative embodiment. FIG. 10 illustrates a result of the action taken in FIG. 9. Specifically, breadcrumb 510 is now part of "check paperwork" pinboard 1000 shown in FIG. 10. In this manner, a user may collect breadcrumbs associated with a variety of different people for which the user wishes to check paperwork. When the user wishes to check an individual's paperwork, the user can then select the corresponding breadcrumb in the corresponding pinboard to access the desired data or software functions. Accordingly, the user may more easily organize information and data, as well as computer functions, and cause the computer to operate more efficiently on that data as well as with respect to software functions.

Figure 11:
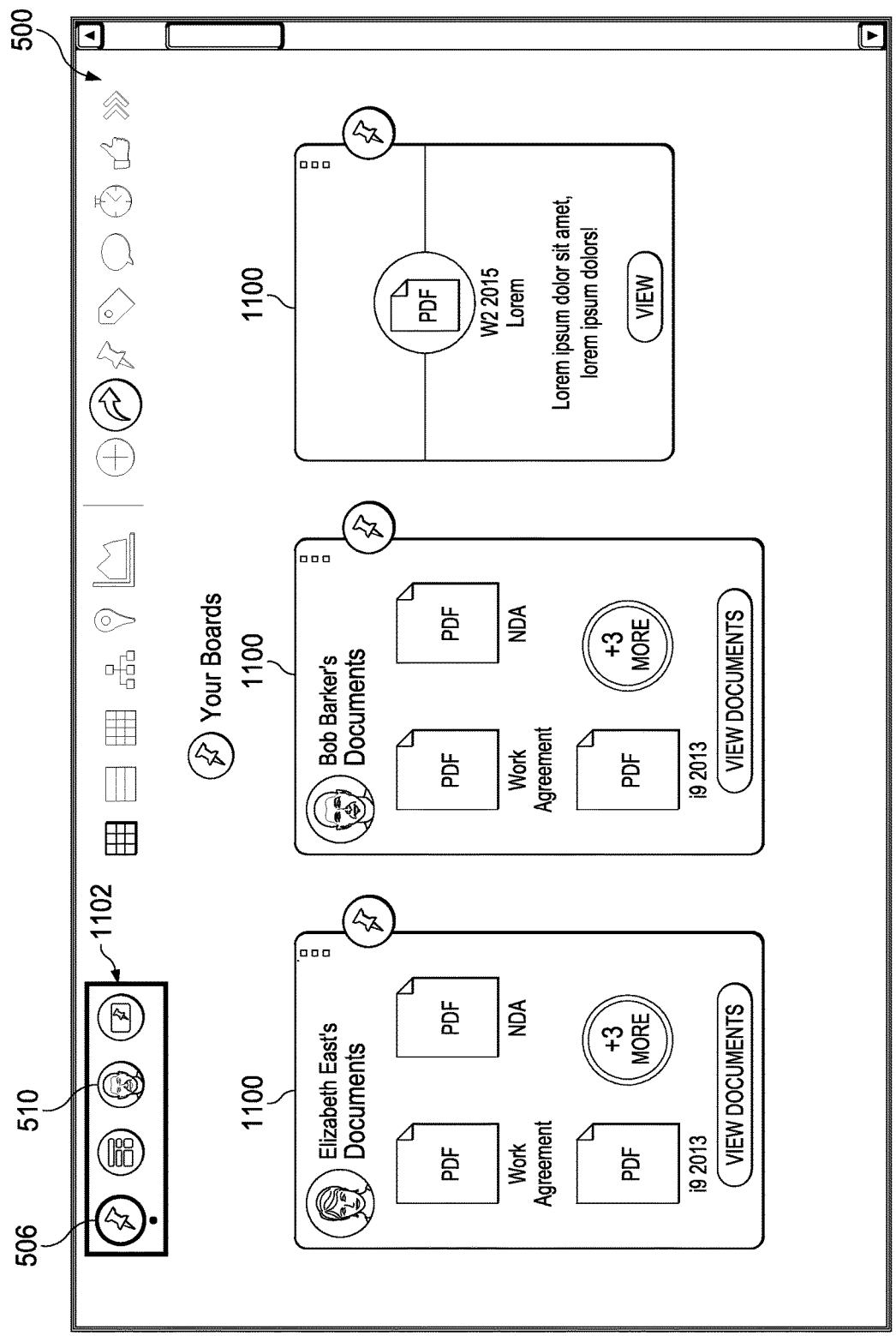
FIG. 11 is another drawing of a pinboard used in conjunction with a dashboard, in accordance with an illustrative embodiment.

FIG. 11 is another drawing of a pinboard used in conjunction with a dashboard, in accordance with an illustrative embodiment. FIG. 11 shows that the pinboards themselves may be manipulated, in addition to the breadcrumbs. For example, if a user selects "check paperwork" pinboard 1000 shown in FIG. 10, then set of pinboards 1100 are shown. These pinboards may show the specific documents to be reviewed for corresponding persons, organized by person (or organized by the corresponding breadcrumb). Additional documents, software functions, or pinboards may also be displayed, such as pinboard 1102.

Figure 12:
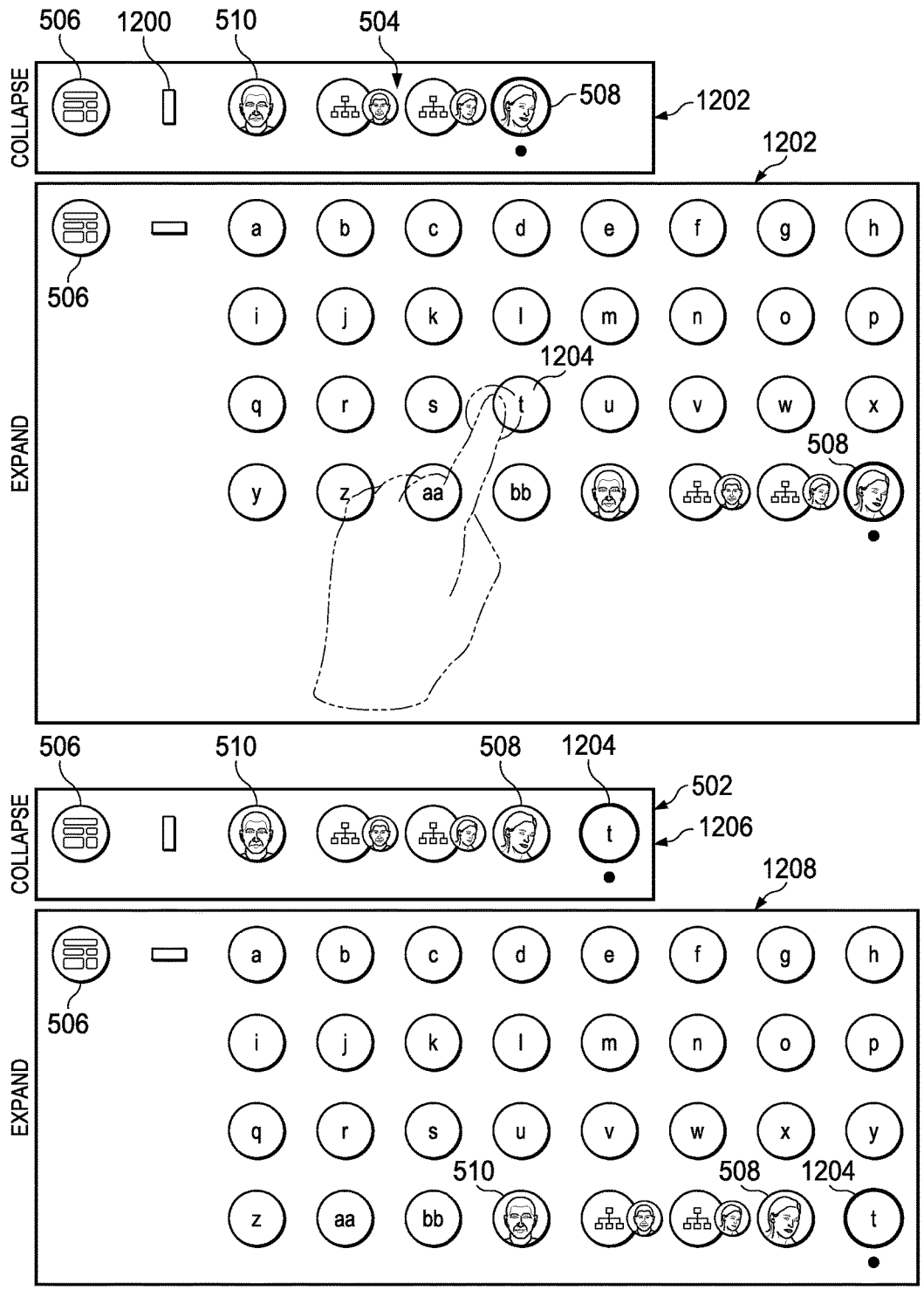
FIG. 12 is an illustration of manipulating a pinboard of breadcrumbs, in accordance with an illustrative embodiment.

FIG. 12 is an illustration of manipulating a pinboard of breadcrumbs, in accordance with an illustrative embodiment. Pinboard 502 shown in FIG. 12 may be any of pinboard 1202 shown in FIG. 1 through FIG. 11. For example, pinboard 502 in FIG. 12 may include breadcrumbs 504, pin icon 506, breadcrumb 508, breadcrumb 510, and separation bar 1200 (which may be separation bar 108 of FIG. 1). Pinboard 502 and its various components may be implemented using a data processing system, such as data processing system 2200 of FIG. 22.

FIG. 12 shows an ability to collapse and expand pinboard 502 in order to enhance ease of use. Thus, for example, pinboard 502 could expand to expanded pinboard 1202 which shows a far larger number of breadcrumbs relative to pinboard 502. Expanded pinboard 1202 could show some or all of the breadcrumbs contained within pinboard 1202.

A user could then manipulate expanded pinboard 502 by using expanded pinboard 1202. For example, the user could select breadcrumb t 1204 from expanded pinboard 1202. As a result, this breadcrumb will now be displayed in pinboard 502, which in this context is collapsed pinboard 1206.

Expanded pinboard 1202 may also be modified as a result of this user action. For example, if the user were to re-expand pinboard 502, then the resulting expanded pinboard may be re-expanded pinboard 1208. Note that the position of breadcrumb t 1204 has been moved to just after breadcrumb 508, which is the same position breadcrumb t 1204 had in collapsed pinboard 1206. In other words, breadcrumb t 1204 has moved from its original position in pinboard 1202 to a new position in re-expanded pinboard 1208. This capability may be used to establish a visual history of breadcrumb use, as shown in FIG. 13.

The illustrative embodiments shown in FIG. 11 and FIG. 12 may be further varied. For example, in an illustrative embodiment, selecting a breadcrumb and modifying the underlying data or software to which the breadcrumb points may cause the breadcrumb to switch positions on either the collapsed pinboard, the expanded pinboard, or both. Thus, the illustrative embodiments are not necessarily limited to the examples shown above.

Figure 13:
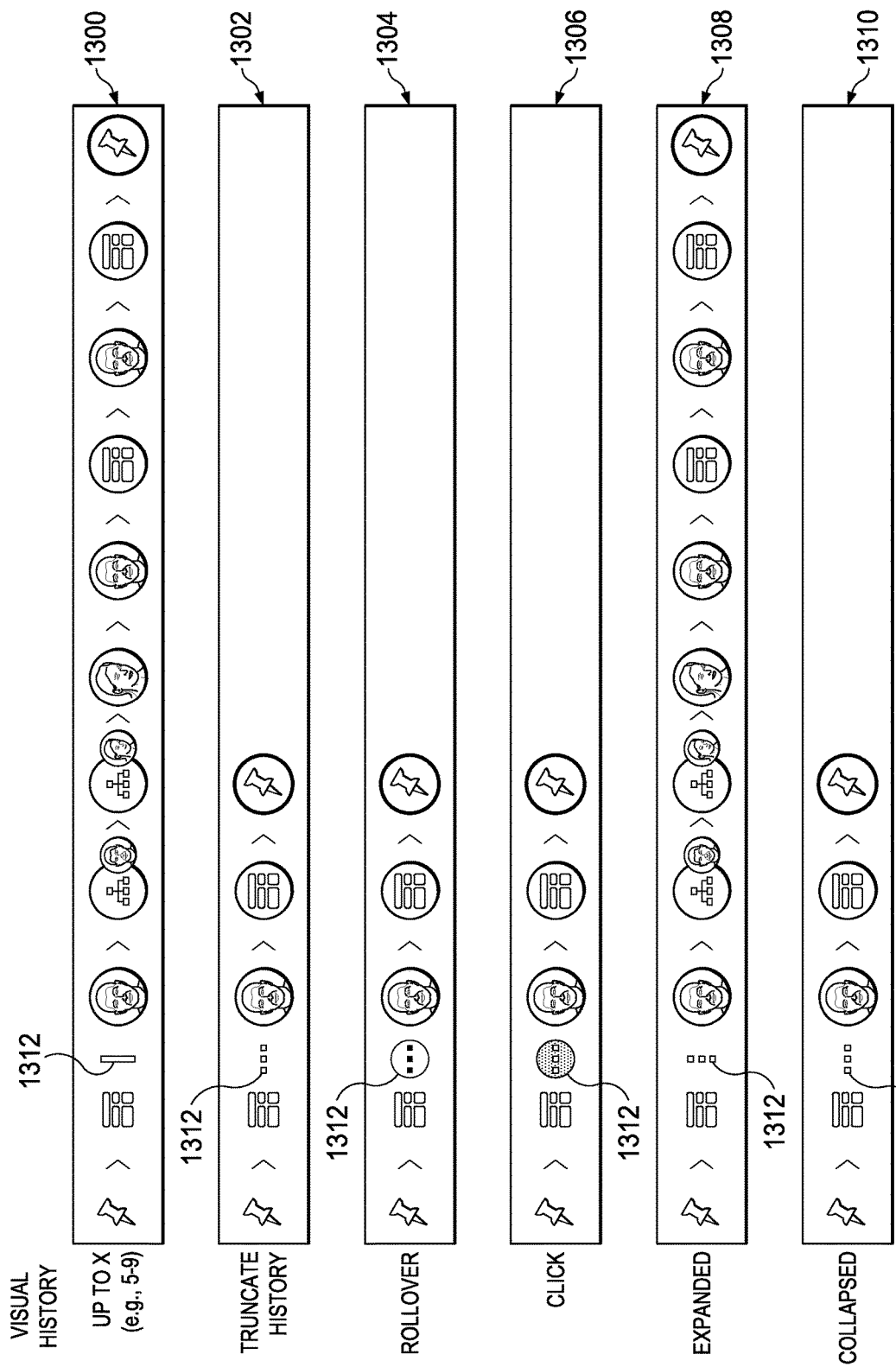
FIG. 13 is another illustration of manipulating a pinboard of breadcrumbs, in accordance with an illustrative embodiment.

FIG. 13 is another illustration of manipulating a pinboard of breadcrumbs, in accordance with an illustrative embodiment. FIG. 13 represents a visual history of breadcrumb use that may be displayed on a pinboard as a result of breadcrumb manipulations, such as that shown in FIG. 11 and FIG. 12. The techniques described with respect to FIG. 13 may be implemented using a data processing system, such as data processing system 2200 of FIG. 22.

Each of row 1300, row 1302, row 1304, row 1306, row 1308, and row 1310 represent the same pinboard, with each succeeding row indicating a result of manipulating the pinboard or its breadcrumbs at an earlier time. In row 1300, an expanded pinboard is shown, truncated to a threshold number of breadcrumbs in order to prevent the pinboard from expanding past a certain area of the physical display unless requested by the user. In an illustrative embodiment, a user may manipulate separation bar 1312 to further truncate the pinboard, as shown in row 1302.

If desired, a user may rollover separation bar 1312, as shown in row 1304, in order to allow it to be selectable for expansion, as shown in row 1306. Once selected, the pinboard is expanded again as shown in row 1308, and may be re-collapsed, as shown in row 1310.

Thus, the illustrative embodiments provide that breadcrumbs may indicate which page is currently selected. If a user navigates to a large number of pages that does not fit well onscreen, a method is desired to truncate the navigation history such that a given number of breadcrumbs are not shown, but rather, the last X breadcrumbs are shown, such as, for example, three to seven. This collapse could be accomplished with the collapse/expand pattern shown in FIG. 13.

Figure 14:
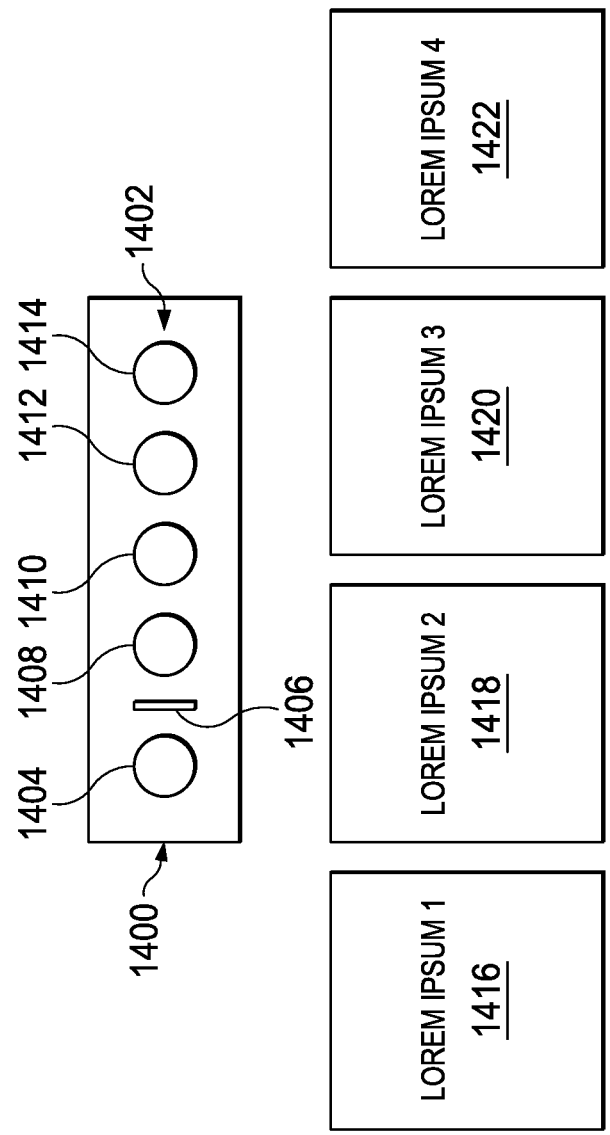
FIG. 14 is an illustration of moving through linked pages when a breadcrumb is selected, in accordance with an illustrative embodiment.

FIG. 14 is an illustration of moving through linked pages when a breadcrumb is selected, in accordance with an illustrative embodiment. Pinboard 1400 may be any of the pinboards described above with respect to FIG. 1 through FIG. 13. Pinboard 1400 and the sequential page viewing process described with respect to FIG. 14 may be implemented using a data processing system, such as data processing system 2200 of FIG. 22.

Pinboard 1400 contains breadcrumbs 1402, which includes breadcrumb pin icon 1404, separation bar 1406, first breadcrumb 1408, second breadcrumb 1410, third breadcrumb 1412, and fourth breadcrumb 1414. More or fewer breadcrumbs may be present on pinboard 1400. Breadcrumb 1408 is associated with or points to page 1416. Breadcrumb 1410 is associated with or points to page 1418. Breadcrumb 1412 is associated with or points to page 1420. Breadcrumb 1414 is associated with or points to page 1422.

In an illustrative embodiment, a user may select breadcrumb 1408 on pinboard 1400, and as a result, page 1416 is displayed. If the user then selects breadcrumb 1414 on pinboard 1400, then in one illustrative embodiment, page 1422 is not immediately displayed. Instead, if the user prefers, the display device may first move from page 1416 to page 1418, and then in succession to page 1420 and finally page 1422. As a result, the user sees a sequence of pages starting with the page associated with the breadcrumb last selected and ending with the next breadcrumb selected, with all intervening pages between those breadcrumbs displayed in sequence.

Alternatively, if the user prefers, only the page associated with the newly selected breadcrumb is displayed. In another alternative, only selected ones of intervening pages are displayed. The selected ones may be selected by content (such as only time entry pages), by count (such as only every third intervening page), or by any other desired rule or policy, possibly programmable by the user.

Thus, the illustrative embodiments described with respect to FIG. 14 allow a user, viewing page 1 (breadcrumb 1), to select breadcrumb 5. In response, the system may move the user sequentially through one or more of the intervening breadcrumbs pages, such as, for example, that the user briefly sees page 2, page 3, and page 4, before finally arriving on page 5.

Additional variations are possible. For example, breadcrumbs may respond to gestures on the page below. For example, the user swipes right on page 1416 (breadcrumb 1408), then the system advances to breadcrumb 1410 to the right. Likewise, if the user swipes left on page 1420 (breadcrumb 1412), the system may advance to the breadcrumb to the left (breadcrumb 1410). In this example, swipe may be replaced by click-and drag, or any other suitable input mechanism.

This feature is similar to a traditional Web browser's forward and back button, but more visually distinct and responding to gestures received by the page below (rather than the breadcrumb or breadcrumb history). Thus, this illustrative embodiment connects the underlying page to the breadcrumbs that establish the link to the page in a way that is not currently used in the art.

Figure 15:
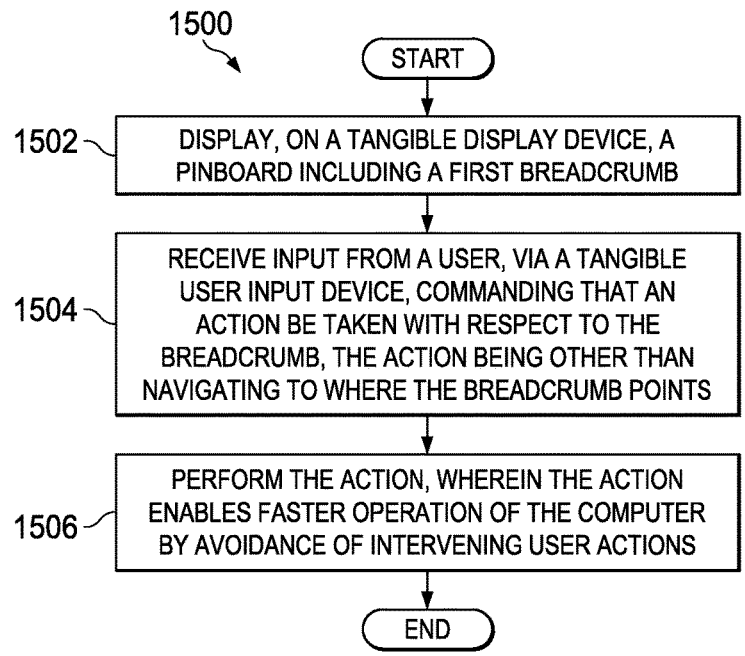
FIG. 15 is a flowchart of a method for performing an action with breadcrumbs, in accordance with an illustrative embodiment.

FIG. 15 is a flowchart of a method for performing an action with breadcrumbs, in accordance with an illustrative embodiment. Method 1500 is implemented using a data processing system, such as data processing system 2200 of FIG. 22. Method 1500 may be a variation of the techniques described with respect to FIG. 1 through FIG. 14. The various operations described with respect to method 1500 are described as being performed by a computer; however, in the context of FIG. 15 the term "computer" may refer to any processor, application specific integrated circuit, application specific processor, or any other tangible, physical hardware operating in conjunction with a tangible, physical display, tangible, physical input devices, and a non-transitory computer readable storage medium.

Method 1500 may begin with displaying, on a tangible display device, a pinboard including a first breadcrumb (operation 1502). Then, the computer may receive input from a user, via a tangible user input device, commanding that an action be taken with respect to the breadcrumb, the action being other than navigating to where the breadcrumb points (operation 1504). The computer may then perform the action, wherein the action enables faster operation of the computer by avoidance of intervening user actions (operation 1506).

Method 1500 may have more, fewer, or different operations. For example, the action may be dragging the first breadcrumb to a different position on the pinboard relative to other breadcrumbs on the pinboard. In another example, the action comprises dragging the first breadcrumb onto a token. In this case, the method further includes displaying on the tangible user input device a list of additional pinboards to which the breadcrumb may be placed.

In another illustrative embodiment, method 1500 may further include receiving a user selection of one of the additional pinboards; and adding the first breadcrumb to the one of the additional pinboards. In still another illustrative embodiment, the action further includes dragging the first breadcrumb onto a second pinboard also displayed on the tangible user input device, and adding the first breadcrumb to the second pinboard. In still another illustrative embodiment, the action further includes selecting the first breadcrumb; responsive to selecting, displaying a list of commands that can be performed with respect to data to which the breadcrumb points; receiving a user selection of a command on the list; and executing the command.

In yet another illustrative embodiment, for method 1500 the action may further include selecting the first breadcrumb; and responsive to selecting, displaying a dashboard of information, actions, or both information and actions in relation to data to which the breadcrumb points. In another illustrative embodiment, method 1500 may further include selecting a second breadcrumb on the pinboard; dragging the second breadcrumb onto the first breadcrumb; and adding data to which the second breadcrumb points to the first breadcrumb. In yet another illustrative embodiment, the breadcrumb indicates which page is currently selected.

In still another illustrative embodiment, method 1500 also includes displaying a plurality of additional breadcrumbs; and limiting a number of the plurality of additional breadcrumbs displayed to a pre-determined number. In this case, method 1500 may additionally include receiving a command to expand a number of breadcrumbs displayed; and displaying at least some of the number of plurality of additional breadcrumbs displayed beyond the pre-determined number.

In a different illustrative embodiment, method 1500 may further include displaying both a second breadcrumb and a third breadcrumb on the pinboard, wherein a page associated with the first breadcrumb is also displayed; receiving a command actuating the third breadcrumb; responsive to receiving the command, displaying a second page associated with the second breadcrumb, waiting a time, and then automatically displaying a third page associated with the third breadcrumb, wherein displaying the second page and the third page appears to the user as a slide-show. In still a different illustrative embodiment, method 1500 may include displaying a page associated with the first breadcrumb; receiving a command to change the page to a different page; and responsive to changing the page, changing display of the pinboard to highlight a second breadcrumb on the pinboard, the second breadcrumb associated with the different page.

Thus, the illustrative embodiments described with respect to FIG. 15 are exemplary only and do not necessarily limit the claimed inventions. Further variations of method 1500 are possible, such as other techniques described with respect to FIG. 1 through FIG. 14.

Figure 16:
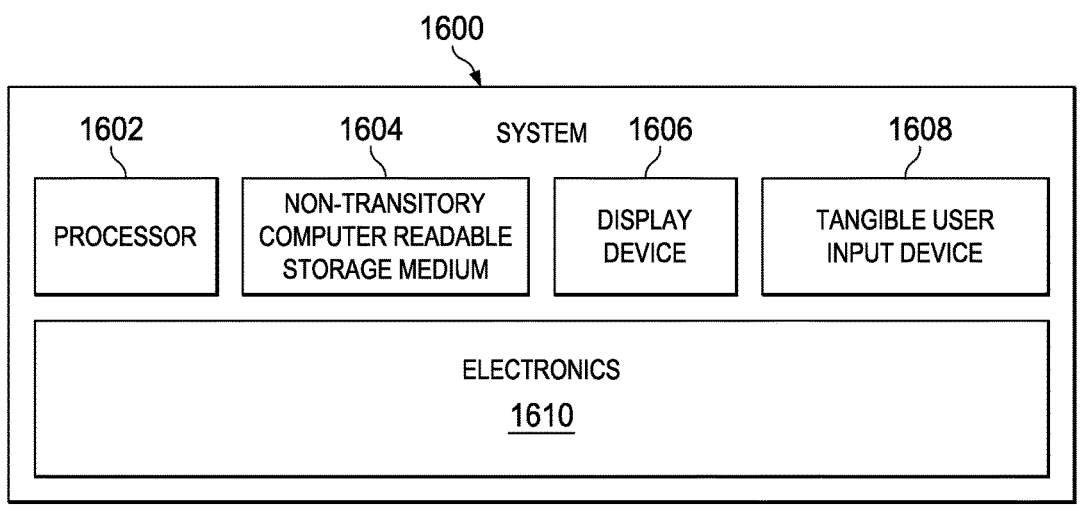
FIG. 16 is a system for implementing a pinboard of breadcrumbs, in accordance with an illustrative embodiment.

FIG. 16 is a system for implementing a pinboard of breadcrumbs, in accordance with an illustrative embodiment. System 1600 is implemented as a data processing system, such as data processing system 2200 of FIG. 22. System 1600 may implement a variation of the techniques described with respect to FIG. 1 through FIG. 15. System 1600 may be described as a computer; however, in the context of FIG. 16, the term "system", including system 1600, may refer to any processor, application specific integrated circuit, application specific processor, or any other tangible, physical hardware operating in conjunction with a tangible, physical display, a tangible, physical input devices, and a non-transitory computer readable storage medium.

Thus, system 1600 may include processor 1602, non-transitory computer readable-readable storage medium 1604 in communication with the processor, display device 1606 in communication with the processor, tangible user input device 1608 in communication with the processor, and electronics 1610 in communication with processor 1602. Electronics 1610 may be physically configured to perform a number of functions. "Physically configured" refers to an application specific integrated circuit, or one or more hardware components, that are physically designed to perform the functions as described below or the methods described with respect to FIG. 15.

Thus, for example, electronics 1610 may be physically configured to order the processor to display, on a tangible display device, a pinboard including a first breadcrumb. Electronics 1610 also may be physically configured to receive input from a user, via the tangible user input device, that commands that an action be taken with respect to the breadcrumb, the action being other than navigating to where the breadcrumb points. Electronics 1610 also may be physically configured to perform the action, wherein the action enables faster operation of the computer by avoidance of intervening user actions.

Other variations are possible. For example, the action may be dragging the first breadcrumb onto a token, in which case electronics 1610 may be further configured to: display on the tangible user input device a list of additional pinboards to which the breadcrumb may be placed. In this case, electronics 1610 may be further configured to: responsive to receiving a user selection of one of the additional pinboards, add the first breadcrumb to the one of the additional pinboards.

In another illustrative embodiment, the action further includes dragging the first breadcrumb onto a second pinboard also displayed on the tangible user input device. In this case, electronics 1610 may be further configured to: add the first breadcrumb to the second pinboard.

In yet another illustrative embodiment, the action further comprises selecting the first breadcrumb. In this case, electronics 1610 may be further configured to: responsive to selecting, display a list of commands that can be performed with respect to data to which the breadcrumb points; receive a user selection of a command on the list; and execute the command.

In still another illustrative embodiment, electronics 1610 may be further configured to preform additional functions. For example, electronics 1610 may be configured to display both a second breadcrumb and a third breadcrumb on the pinboard, wherein a page associated with the first breadcrumb is also displayed. Subsequently, electronics 1610 may be configured to receive a command actuating the third breadcrumb. Subsequently, electronics 1610 may be configured to, responsive to receiving the command, display a second page associated with the second breadcrumb, wait a time, and then automatically display a third page associated with the third breadcrumb.

In yet another illustrative embodiment, the action may be one of deleting or hiding the first breadcrumb from the pinboard. In this case, deleting or hiding is accomplished by either of: dragging the first breadcrumb away and off of the pinboard; or right-clicking on the first breadcrumb using a mouse as the tangible user input device, and selecting an option to delete or hide the first breadcrumb.

The illustrative embodiments also provide for a non-transitory computer readable storage medium storing computer usable program code which, when executed by a processor, performs a method implemented by a computer. The computer usable program code may include computer usable program code for displaying, on a tangible display device, a pinboard including a first breadcrumb. The computer usable program code may also include computer usable program code for receiving input from a user, via a tangible user input device, commanding that an action be taken with respect to the breadcrumb, the action being other than navigating to where the breadcrumb points. The computer usable program code may also include computer usable program code for performing the action, wherein the action enables faster operation of the computer by avoidance of intervening user actions.

Thus, the illustrative embodiments described with respect to FIG. 16 are exemplary only and do not necessarily limit the claimed inventions. Further variations of electronics 1610 are possible, such as according to techniques described with respect to FIG. 1 through FIG. 15.

Figure 17:
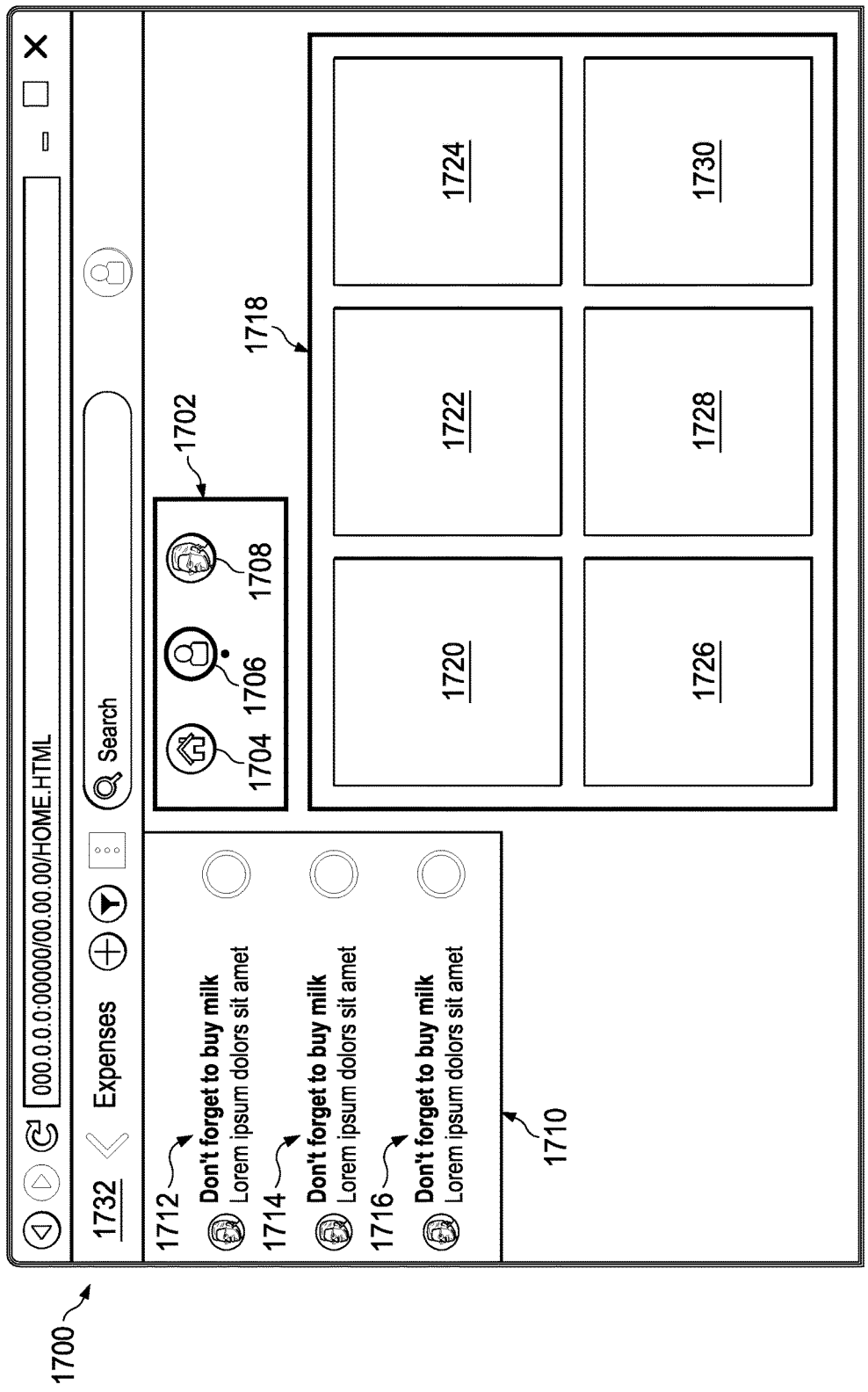
FIG. 17 illustrates a tangible display in which a breadcrumb and a display area are updated in response to selecting a category, in accordance with an illustrative embodiment.

FIG. 17 illustrates a tangible display in which a breadcrumb and a display area are updated in response to selecting a category, in accordance with an illustrative embodiment. Screenshot 1700 may be an example of how a tangible display is altered by program code as described below. Screenshot 1700 may represent a graphical user interface of a software program implemented by an application specific integrated circuit or a data processing system, such as data processing system 2200 of FIG. 22.

In an illustrative embodiment, at least four display areas are shown in screenshot 1700. These display areas include first area 1702. First area 1702 may be termed a pinboard, which, as defined above, is an area on a display where breadcrumbs are collected and/or organized. This pinboard may contain one or more breadcrumbs, such as breadcrumb 1704, which represents a "home" breadcrumb; breadcrumb 1706, which will be described further below; and breadcrumb 1708, which represents a person to whom the displayed subject matter relates. This information may be the first data to which the breadcrumb points.

The display represented by screenshot 1700 may also include second area 1710, which is different than first area 1702. Second area 1710 is a portion of the display or graphical user interface which shows interactive categories of information regarding the first data, which again relates to breadcrumb 1708. The categories in second area 1710 may be a task list, one or more timelines, different categories of information relating to the employment of a person, or any other suitable categories. In the illustrative embodiment shown in FIG. 17, the categories in second area 1710 represent a checklist, represented by first category 1712, second category 1714, and third category 1716.

The display represented by screenshot 1700 may also include third area 1718, which is different than first area 1702 and second area 1710. Third area 1718 is a portion of the display or graphical user interface which shows details regarding first category 1712 when first category 1712 is selected by a user. Third area 1718 changes again when a user selects another category, such as second category 1714 or third category 1716. Optionally, third area 1718 may include one or more sub-areas in order to better organize or present information, such as, but not limited to, sub-area 1720, sub-area 1722, sub-area 1724, sub-area 1726, sub-area 1728, and sub-area 1730. Information in third area 1718 or one of the corresponding sub-areas may relate to details for carrying out the task represented by first category 1712.

In addition to displaying details regarding first category 1712 in third area 1718, in response to the user selecting first category 1712 in second area 1710, the computer simultaneously updates one or more of the breadcrumbs in first area 1702. This update may be to cause a breadcrumb to point to second data relating to first category 1712. In this manner, faster operation of the computer is enabled by avoidance of intervening user actions.

In a specific, non-limiting example using the graphical user interface shown in FIG. 17, breadcrumb 1706 may be created and added to the pinboard represented by first area 1702 at the same time that information regarding first category 1712 is displayed in third area 1718. In this case, breadcrumb 1706 may aid a user at a later time to navigate back to this particular set of information shown in third area 1718. In another example, any one of breadcrumb 1704, breadcrumb 1706, or breadcrumb 1708 may be updated with new information that relates to the fact that the user selected first category 1712. In a more specific example, breadcrumb 1708 could be updated so that when the user later selects breadcrumb 1708, other information is displayed in third area 1718, but now the displayed information includes an indication that the user has previously selected or performed tasks related to first category 1712.

The illustrative embodiments may vary from those described above. More or different categories could be displayed. More or different areas may be displayed on the graphical user interface represented by screenshot 1700. For example, fourth area 1732 may be added to the graphical user interface. Fourth area 1732 may be used to organize which categories are displayed in second area 1710. For example, fourth area 1732 may display an ontologically more abstract category, which may be termed a higher level category, which includes all of the categories shown in second area 1710. In a more specific example, fourth area 1732 may display "expenses" and second area 1710 may display specific categories or tasks that relate to "expenses."

In an illustrative embodiment, a user may select a portion of fourth area 1732. In response, the computer may display a pop-up window, or some other means for selecting among two or more higher-level categories. Each of the selectable higher-level categories may include lower-level categories. For example, another higher-level category that could be selected in fourth area 1732 could be "personnel information," with lower-level categories relating to "hiring information," "contact information," "pay information," and possibly other categories. In each case, whichever higher-level category and lower-level category that are selected in combination can change the information shown in third area 1718. Likewise, selecting either a higher-level category in fourth area 1732, a lower-level category in second area 1710, or a combination thereof, may simultaneously cause the computer to update one or more of the breadcrumbs shown in the pinboard of first area 1702.

Attention is now turned to another specific, non-limiting example of use of the graphical user interface represented by screenshot 1700. When a user clicks on a timeline process, which may be the higher-level categories shown in fourth area 1732, three events may occur automatically and simultaneously. First, the name of the page shown changes. For example, the term "Expenses" may be displayed in fourth area 1732 in order to indicate that the higher-level category of "Expenses" is being displayed. Second, since in this example the categories under "Expenses" relate to a timeline, the timeline shown in second area 1710 changes. Third, a breadcrumb shown in first area 1702 is updated to refer back to the currently displayed page or pages shown in third area 1718.

Figure 19:
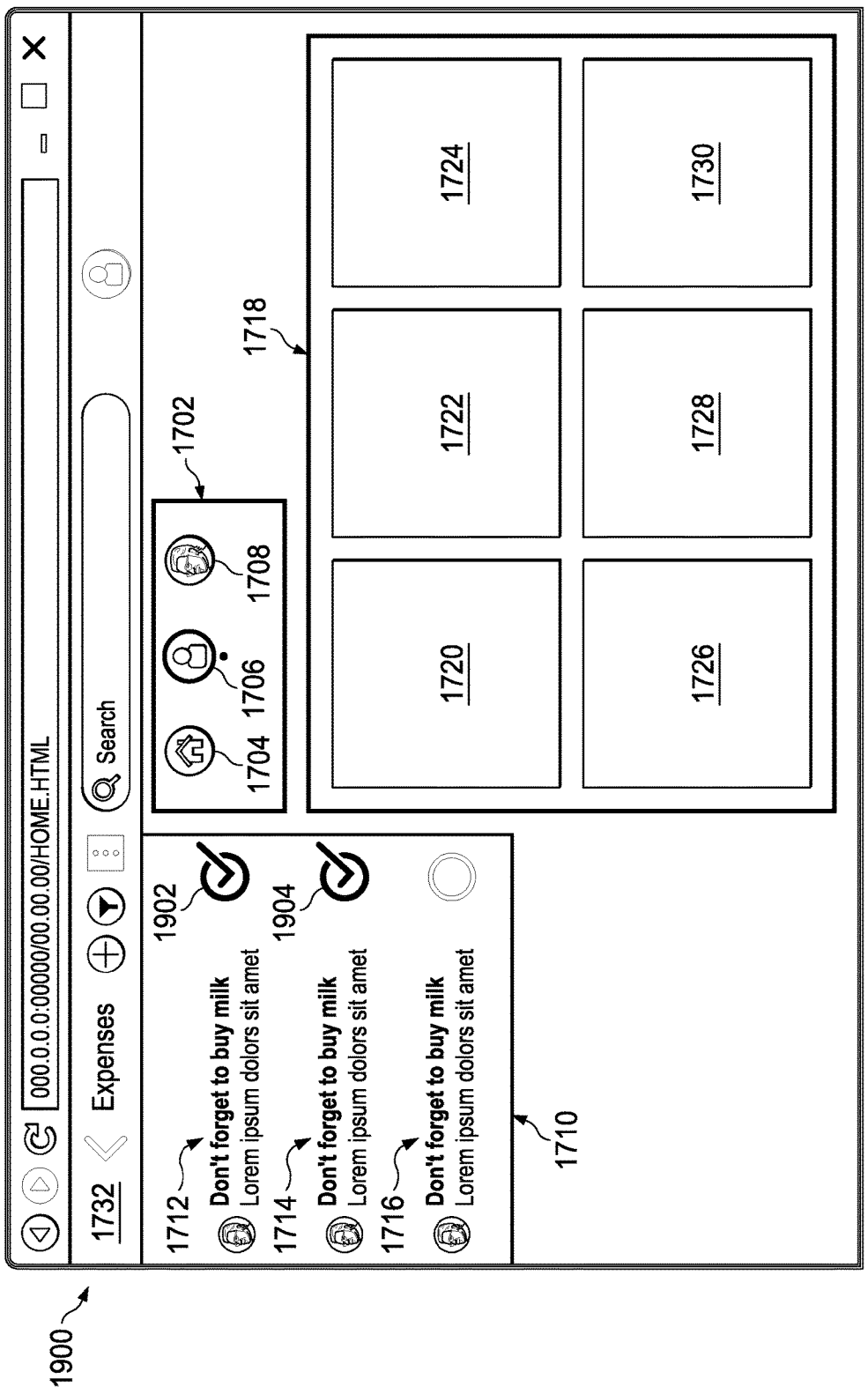
FIG. 19 illustrates a tangible display in which steps of a process category are indicated as being completed and breadcrumb modification, in accordance with an illustrative embodiment.

The illustrative embodiments described above may be further varied. For example, the categories shown in second area 1710 may represent one or more steps or one or more tasks in a process. In this case, the displayed categories may have multiple functions. For example, if the steps or tasks are simple, then the user may act upon those tasks directly, either by manipulating portions of second area 1710, as shown in FIG. 19, or by manipulating portions of third area 1718, or both. In another example, if the steps or tasks are more complex, then the categories shown in second area 1710 may simply name a step or task that is to be worked upon. In this case, the categories displayed in second area 1710 may function like anchor links which later jump down to a particular step in the process as a user works within and manipulates information shown in third area 1718.

The illustrative embodiments described with respect to FIG. 17 may be further varied, such as described below with respect to FIG. 18 through FIG. 21. The look and feel of any of the areas described with respect to FIG. 17 may be varied; for example, what is shown are blocks or squares, but the areas may have a variety of different shapes and may be organized differently on a given graphical user interface. A particular area may be discontinuously represented on a graphical user interface; that is, broken up into two or more areas on a graphical user interface, but nevertheless have the same logical functions and purposes described above. Thus, the claimed inventions are not necessarily limited to the examples described with respect to FIG. 17.

Figure 18:
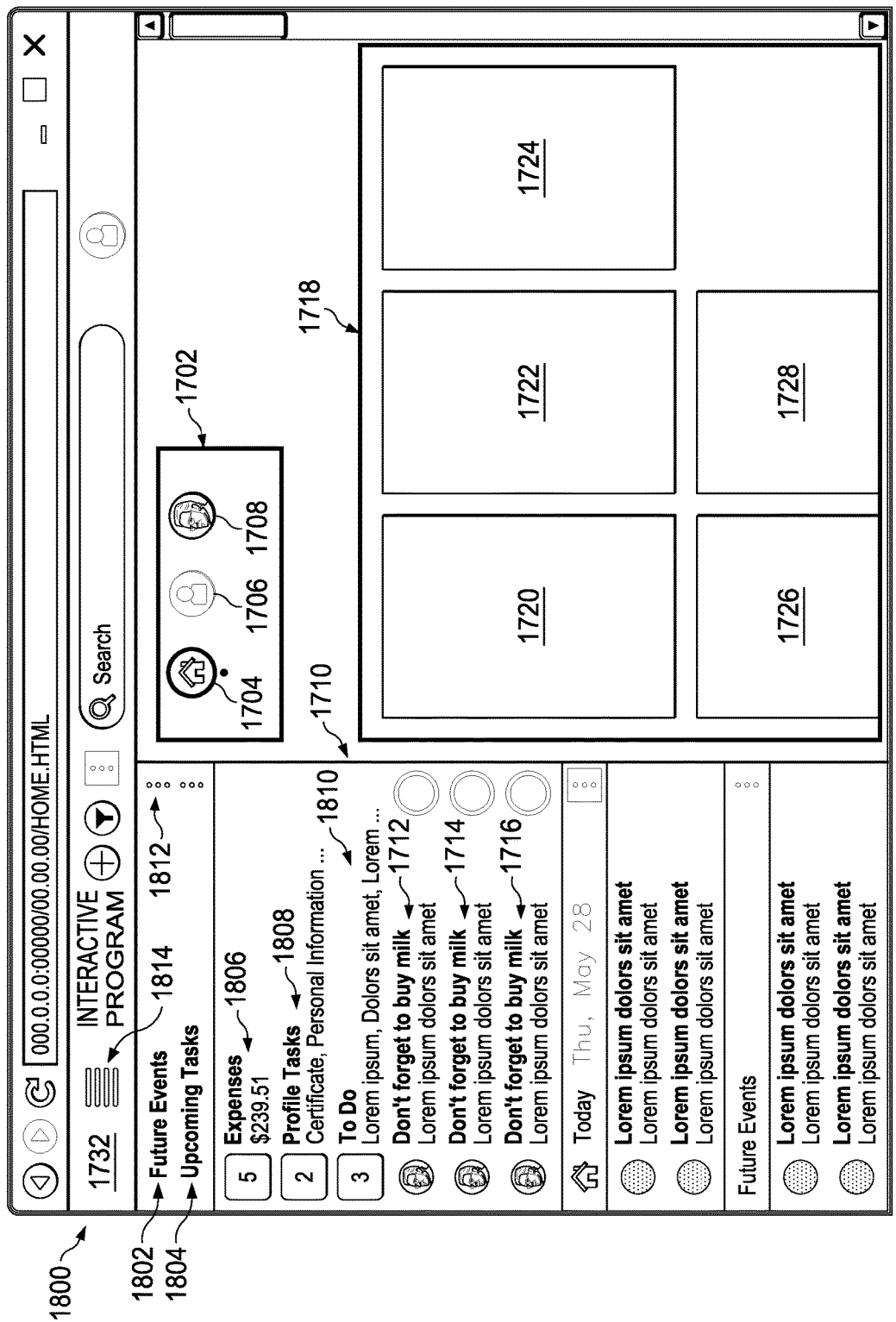
FIG. 18 illustrates a tangible display in which a timeline is used for navigation and breadcrumb creation, in accordance with an illustrative embodiment.

FIG. 18 illustrates a tangible display in which a timeline is used for navigation and breadcrumb creation, in accordance with an illustrative embodiment. Screenshot 1800 may be an example of how a tangible display is altered by program code as described below. Screenshot 1800 may be a variation of screenshot 1700, such as, for example, if a user had selected fourth area 1732 and then selected the "Interactive Program" higher-level category. Screenshot 1800 may represent a graphical user interface of a software program implemented by an application specific integrated circuit or a data processing system, such as data processing system 2200 of FIG. 22. FIG. 18 and FIG. 17 share common reference numerals. Reference numerals in common with both FIG. 17 and FIG. 18 refer to similar objects or areas, and share the same descriptions except where noted.

As mentioned above, screenshot 1800 shows the state of the graphical user interface after a user has selected a new higher-level category in fourth area 1732, namely the "Interactive Program." In doing so, additional information is presented, in this case displaying additional categories in addition to the task specific categories shown in FIG. 17. Thus, for example, also shown are category 1802 ("future events"), category 1804 ("upcoming tasks"), category 1806 ("expenses"), category 1808 ("profile tasks") and category 1810 ("to-do"). Additionally, vertical ellipses 1812 indicate that some of these certain categories may be further expanded, or that additional information or commands may be displayed by selecting vertical ellipses 1812. Hamburger icon 1814 may be used to allow the user to display different higher-level categories or perhaps information or functions relating to information displayed in fourth area 1732.

In each case, the functionality of first area 1702, second area 1710, third area 1718, and fourth area 1732 may be the same as described above with respect to FIG. 17. FIG. 18 describes additional levels of information and variations to those shown in FIG. 17.

In a specific, non-limiting example relating to the graphical user interface shown in FIG. 18, the categories shown in second area 1710 may be a timeline. The timeline may be turned on and off via hamburger icon 1814. When the timeline is shown, as it is in FIG. 18, the categories in the timeline can be used for navigation and for changing the information shown in third area 1718.

For example, when a user clicks on category 1806 ("expenses"), information regarding expenses is displayed in third area 1718, and simultaneously a new breadcrumb (in this case, breadcrumb 1706) is generated and displayed in first area 1702. Yet further, simultaneously with the other two actions, the timeline in second area 1710 will show the steps for category 1806 ("expenses")—these steps are shown as first category 1712, second category 1714, and third category 1716. Thus, FIG. 18 represents a manner of displaying additional information and actions relative to FIG. 17.

In this particular illustrative embodiment, the breadcrumbs in first area 1702 may represent the breadth of the underlying software system represented in part by the graphical user interface shown in screenshot 1800. These breadcrumbs may be actions being performed in parallel, or perhaps in series. The timeline shown in second area 1710 may represent the depth of actions that could be taken, or the number of actions that could be taken. Other variations are possible.

The illustrative embodiments described with respect to FIG. 18 may be further varied, such as described below with respect to FIG. 19 through FIG. 21. The look and feel of any of the areas described with respect to FIG. 18 may be varied; for example, what is shown are blocks or squares, but the areas may have a variety of different shapes and may be organized differently on a given graphical user interface. A particular area may be discontinuously represented on a graphical user interface; that is, broken up into two or more areas on a graphical user interface, but nevertheless have the same logical functions and purposes described above. Thus, the claimed inventions are not necessarily limited to the examples described with respect to FIG. 18.

FIG. 19 illustrates a tangible display in which steps of a process category are indicated as being completed and breadcrumb modification, in accordance with an illustrative embodiment. Screenshot 1900 may be an example of how a tangible display is altered by program code as described below. Screenshot 1700 may represent a graphical user interface of a software program implemented by an application specific integrated circuit or a data processing system, such as data processing system 2200 of FIG. 22. Screenshot 1900 may be a variation of screenshot 1700. FIG. 17 through FIG. 19 share common reference numerals. Reference numerals in common to any of FIG. 17 through FIG. 19 refer to similar objects or areas, and share the same descriptions except where noted.

Screenshot 1900 shows additional functionality that may be provided within second area 1710. Specifically, each of first category 1712, second category 1714, and third category 1716 may be associated with one or more selectable icons, such as selectable icon 1902 and selectable icon 1904. Responsive to a user selecting a selectable icon, the computer may update the selectable icon to include a check mark or some other indicator that indicates that the task or step represented by the corresponding category has been completed.

Thus, for example, a user may select selectable icon 1902. The computer then updates the graphical user interface as represented by screenshot 1900 to include a check mark within selectable icon 1902. The underlying software and/or data is then updated to indicate that the task or step associated with category 1712 has been completed.

Optionally, information may be updated and displayed within third area 1718. Optionally, and possibly simultaneously, one or more breadcrumbs within first area 1702 may be updated. These processes are described above with respect to FIG. 17.

The illustrative embodiments described with respect to FIG. 19 may be further varied, such as described below with respect to FIG. 20 and FIG. 21. The look and feel of any of the areas described with respect to FIG. 19 may be varied; for example, what is shown are blocks or squares, but the areas may have a variety of different shapes and may be organized differently on a given graphical user interface. In another example, the selectable icons may have different shapes, and more or fewer selectable icons may be presented for a given category. Selectable icons may be grayed out or highlighted as desired to indicate tasks that remain to be completed. A particular area may be discontinuously represented on a graphical user interface; that is, broken up into two or more areas on a graphical user interface, but nevertheless have the same logical functions and purposes as described above. Thus, the claimed inventions are not necessarily limited to the examples described with respect to FIG. 19.

Figure 20:
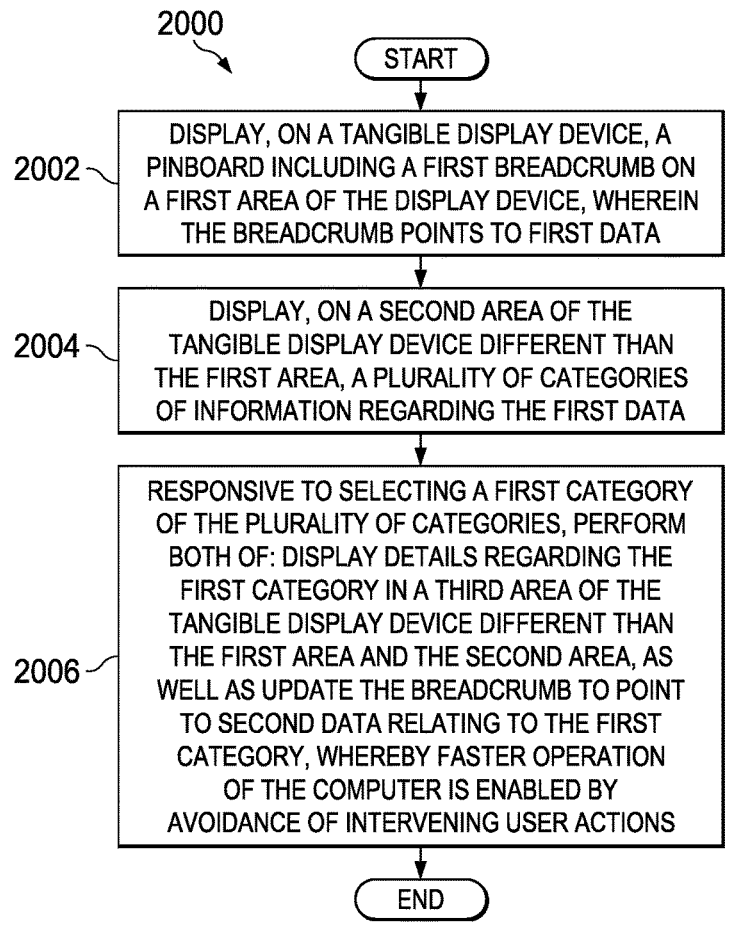
FIG. 20 is a flowchart of a computer-implemented method for simultaneously updating a breadcrumb and displaying information in response to selecting a category, in accordance with an illustrative embodiment.

FIG. 20 is a flowchart of a computer-implemented method for simultaneously updating a breadcrumb and displaying information in response to selecting a category, in accordance with an illustrative embodiment. Method 2000 is implemented using a data processing system, such as data processing system 2200 of FIG. 22. Method 2000 may be a variation of the techniques described with respect to FIG. 1 through FIG. 19, particularly FIG. 17 through FIG. 19. The various operations described with respect to method 2000 are described as being performed by a computer; however, in the context of FIG. 20, the term "computer" may refer to any processor, application specific integrated circuit, application specific processor, or any other tangible, physical hardware operating in conjunction with a tangible, physical display, a tangible, physical input devices, and a non-transitory computer readable storage medium.

Method 2000 is implemented in a computer. Method 2000 may include displaying, on a tangible display device, a pinboard including a first breadcrumb on a first area of the display device, wherein the breadcrumb points to first data (operation 2002). Method 2000 may also include displaying, on a second area of the tangible display device different than the first area, a plurality of categories of information regarding the first data (operation 2004). Method 2000 may also include, responsive to selecting a first category of the plurality of categories, performing both of: displaying details regarding the first category in a third area of the tangible display device different than the first area and the second area, as well as updating the breadcrumb to point to second data relating to the first category, whereby faster operation of the computer is enabled by avoidance of intervening user actions (operation 2006).

Method 2000 may be varied. For example, in one illustrative embodiment, the first category is a timeline. In this case, method 2000 may further include displaying, in the second area, one or more steps of a process related to the timeline. In addition, method 2000 may further include, responsive to selecting a particular step of the one or more steps, displaying an indication that the particular step is complete. Alternatively, method 2000 may further include, responsive to user input, adding another step to the one or more steps. In this case, the user may be a first person other than a second person selecting the timeline. In a related illustrative embodiment, method 2000 may further include displaying, in the second area, one or more sub-steps of the process under a first step of the one or more steps.

Method 2000 may be further varied. For example, method 2000 may further include displaying on a fourth area of the tangible display device, different than the first area, second area, and the third area, a name of the first category. In this case, method 2000 may further include, responsive to selecting the fourth area, displaying to the user other categories in the one or more categories for selection.

Other variations are possible. For example, the first data may be regarding one of a person and a project. However, the first data may relate to many different things. For example, the first data may relate to a person, a project, a position, a work agreement, an asset, a page, a view, an entity, or possibly many other things. The breadcrumb for the first data points to the first data in the second and/or third area that it relates to, depending on what PAGE/VIEW and importantly, what STATE it represents. For example, if the breadcrumb represents a transfer (transfer person A from manager X to manager Y) and the transfer experience required ten steps, then the breadcrumb could represent the transfer process and the fact that the last step the user completed was step seven; thus the breadcrumb is updated to represent the corresponding page/view/entity plus state.

Thus, the illustrative embodiments described with respect to FIG. 20 are exemplary only and do not necessarily limit the claimed inventions. Further variations of method 2000 are possible, such as other techniques described with respect to FIG. 1 through FIG. 19, particularly FIG. 17 through FIG. 19.

Figure 21:
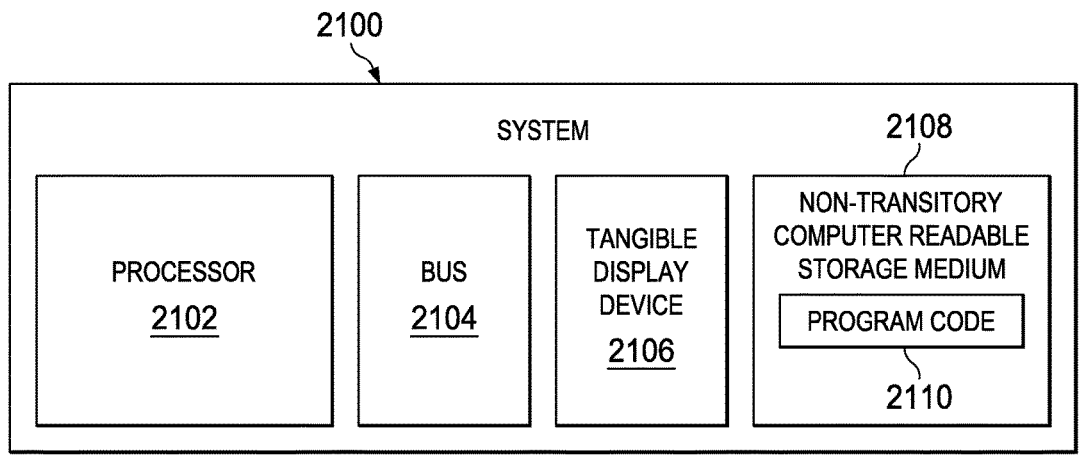
FIG. 21 is a computer for implementing simultaneous updates to a breadcrumb and display of information in response to selecting a category on a tangible display device, in accordance with an illustrative embodiment.

FIG. 21 is a computer for implementing simultaneous updates to a breadcrumb and a display of information in response to selecting a category on a tangible display device, in accordance with an illustrative embodiment. System 2100 is implemented as a data processing system, such as data processing system 2200 of FIG. 22. System 2100 may implement a variation of the techniques described with respect to FIG. 1 through FIG. 20, particularly FIG. 17 through FIG. 20. System 2100 may be described as a computer; however, in the context of FIG. 21 the term "system", including system 2100, may refer to any processor, application specific integrated circuit, application specific processor, or any other tangible, physical hardware operating in conjunction with a tangible, physical display, a tangible, physical input devices, and a non-transitory computer readable storage medium.

System 2100 may be a computer. The computer may include processor 2102, bus 2104 in communication with processor 2102, tangible display device 2106 in communication with processor 2102, and non-transitory computer-readable storage medium 2108 in communication with processor 2102. Non-transitory computer-readable storage medium 2108 stores program code 2110 which, when executed by the processor, performs a method and changes non-transitory computer-readable storage medium 2108 and tangible display device 2106.

Program code 2110 may include program code for displaying, on tangible display device 2106, a pinboard including a first breadcrumb on a first area of the display device, wherein the breadcrumb points to first data. Program code 2110 may also include program code for displaying, on a second area of the tangible display device different than the first area, a plurality of categories of information regarding the first data. Program code 2110 may also include program code for, responsive to selecting a first category of the plurality of categories, performing both of: displaying details regarding the first category in a third area of the tangible display device different than the first area and the second area, as well as updating the breadcrumb to point to second data relating to the first category, whereby faster operation of the computer is enabled by avoidance of intervening user actions.

System 2100 may be further varied. For example, when the first category is a timeline, program code 2110 may also include program code for displaying, in the second area, one or more steps of a process related to the timeline. In this case, program code 2110 may also include program code for, responsive to selecting a particular step of the one or more steps, displaying an indication that the particular step is complete. In another illustrative embodiment, program code 2110 may also include program code for, responsive to user input, adding another step to the one or more steps. In this case, the user may be a first person other than a second person selecting the timeline. In another illustrative embodiment, program code 2110 may also include program code for displaying, in the second area, one or more sub-steps of the process under a first step of the one or more steps.

In a different illustrative embodiment, program code 2110 may also include program code for displaying on a fourth area of the tangible display device, different than the first area, second area, and the third area, a name of the first category. In this case, program code 2110 may also include program code for, responsive to selecting the fourth area, displaying to the user other categories in the one or more categories for selection. In still another illustrative embodiment, the first data may be regarding one of a person and a project.

In a related illustrative embodiment, non-transitory computer readable storage medium 2108 may take the form of a non-transitory computer readable storage medium storing program code which, when executed by a processor, performs a method and changes the non-transitory computer readable storage medium and a tangible display device. Such program code may be any of the variations of program code 2110 described above with respect to system 2100.

Thus, the illustrative embodiments described with respect to FIG. 21 are exemplary only and do not necessarily limit the claimed inventions. Further variations of the program code described for program code 2110 are possible, such as according to techniques described with respect to FIG. 1 through FIG. 20, particularly FIG. 17 through FIG. 19.

Figure 22:
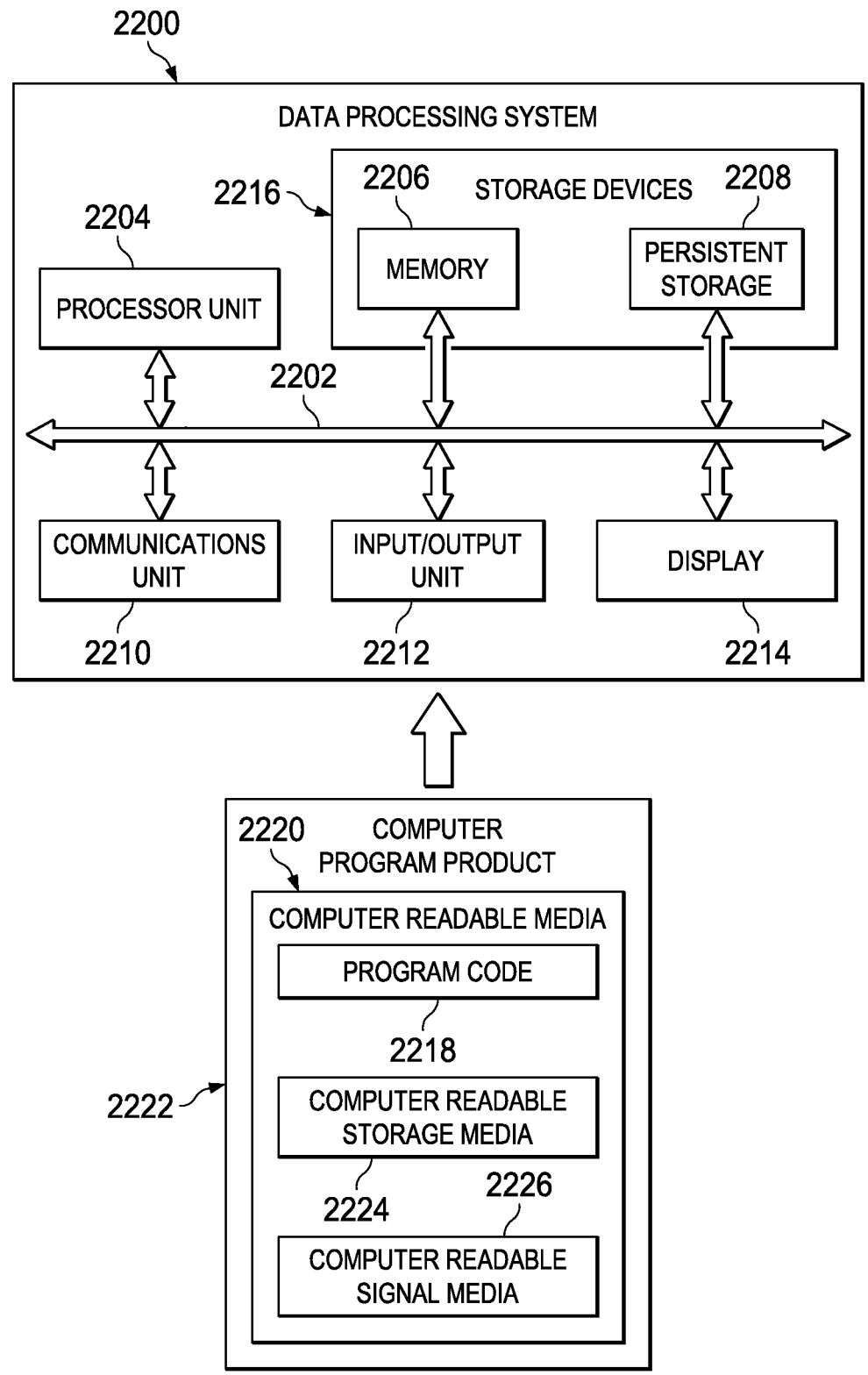
FIG. 22 illustrates a data processing system, in accordance with an illustrative embodiment.

Turning now to FIG. 22, an illustration of a data processing system is depicted in accordance with an illustrative embodiment. Data processing system 2200 in FIG. 22 is an example of a data processing system that may be used to implement the illustrative embodiments, such as the techniques described with respect to FIG. 1 through FIG. 19. In this illustrative example, data processing system 2200 includes communications fabric 2202, which provides communications between processor unit 2204, memory 2206, persistent storage 2208, communications unit 2210, input/output (I/O) unit 2212, and display 2214.

Processor unit 2204 serves to execute instructions for software that may be loaded into memory 2206. This software may be an associative memory, content addressable memory, or software for implementing the processes described elsewhere herein. Processor unit 2204 may be a number of processors, a multi-processor core, or some other type of processor, depending on the particular implementation. A number, as used herein with reference to an item, means one or more items. Further, processor unit 2204 may be implemented using a number of heterogeneous processor systems in which a main processor is present with secondary processors on a single chip. As another illustrative example, processor unit 2204 may be a symmetric, multi-processor system containing multiple processors of the same type.

Memory 2206 and persistent storage 2208 are examples of storage devices 2216. A storage device is any piece of hardware that is capable of storing information, such as, for example, without limitation, data, program code in functional form, and/or other suitable information either on a temporary basis and/or a permanent basis. Storage devices 2216 may also be referred to as computer readable storage devices in these examples. Memory 2206, in these examples, may be, for example, a random access memory or any other suitable volatile or non-volatile storage device. Persistent storage 2208 may take various forms, depending on the particular implementation.

For example, persistent storage 2208 may contain one or more components or devices. For example, persistent storage 2208 may be a hard drive, a flash memory, a rewritable optical disk, a rewritable magnetic tape, or some combination of the above. The media used by persistent storage 2208 also may be removable. For example, a removable hard drive may be used for persistent storage 2208.

Communications unit 2210, in these examples, provides for communications with other data processing systems or devices. In these examples, communications unit 2210 is a network interface card. Communications unit 2210 may provide communications through the use of either or both physical and wireless communications links.

Input/output (I/O) unit 2212 allows for input and output of data with other devices that may be connected to data processing system 2200. For example, input/output (I/O) unit 2212 may provide a connection for user input through a keyboard, a mouse, and/or some other suitable input device. Further, input/output (I/O) unit 2212 may send output to a printer. Display 2214 provides a mechanism to display information to a user.

Instructions for the operating system, applications, and/or programs may be located in storage devices 2216, which are in communication with processor unit 2204 through communications fabric 2202. In these illustrative examples, the instructions are in a functional form on persistent storage 2208. These instructions may be loaded into memory 2206 for execution by processor unit 2204. The processes of the different embodiments may be performed by processor unit 2204 using computer implemented instructions, which may be located in a memory, such as memory 2206.

These instructions are referred to as program code, computer usable program code, or computer readable program code that may be read and executed by a processor in processor unit 2204. The program code in the different embodiments may be embodied on different physical or computer readable storage media, such as memory 2206 or persistent storage 2208.

Program code 2218 is located in a functional form on computer readable media 2220 that is selectively removable and may be loaded onto or transferred to data processing system 2200 for execution by processor unit 2204. Program code 2218 and computer readable media 2220 form computer program product 2222 in these examples. In one example, computer readable media 2220 may be computer readable storage media 2224 or computer readable signal media 2226. Computer readable storage media 2224 may include, for example, an optical or magnetic disk that is inserted or placed into a drive or other device that is part of persistent storage 2208 for transfer onto a storage device, such as a hard drive, that is part of persistent storage 2208. Computer readable storage media 2224 also may take the form of a persistent storage, such as a hard drive, a thumb drive, or a flash memory, that is connected to data processing system 2200. In some instances, computer readable storage media 2224 may not be removable from data processing system 2200.

Alternatively, program code 2218 may be transferred to data processing system 2200 using computer readable signal media 2226. Computer readable signal media 2226 may be, for example, a propagated data signal containing program code 2218. For example, computer readable signal media 2226 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 2218 may be downloaded over a network to persistent storage 2208 from another device or data processing system through computer readable signal media 2226 for use within data processing system 2200. For instance, program code stored in a computer readable storage medium in a server data processing system may be downloaded over a network from the server to data processing system 2200. The data processing system providing program code 2218 may be a server computer, a client computer, or some other device capable of storing and transmitting program code 2218.

The different components illustrated for data processing system 2200 are not meant to provide architectural limitations to the manner in which different embodiments may be implemented. The different illustrative embodiments may be implemented in a data processing system including components in addition to or in place of those illustrated for data processing system 2200. Other components shown in FIG. 22 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 2204 may take the form of a hardware unit that has circuits that are manufactured or configured for a particular use. This type of hardware may perform operations without needing program code to be loaded into a memory from a storage device to be configured to perform the operations.

For example, when processor unit 2204 takes the form of a hardware unit, processor unit 2204 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, programmable array logic, a field programmable logic array, a field programmable gate array, and other suitable hardware devices. With this type of implementation, program code 2218 may be omitted because the processes for the different embodiments are implemented in a hardware unit.

In still another illustrative example, processor unit 2204 may be implemented using a combination of processors found in computers and hardware units. Processor unit 2204 may have a number of hardware units and a number of processors that are configured to run program code 2218. With this depicted example, some of the processes may be implemented in the number of hardware units, while other processes may be implemented in the number of processors.

As another example, a storage device in data processing system 2200 is any hardware apparatus that may store data. Memory 2206, persistent storage 2208, and computer readable media 2220 are examples of storage devices in a tangible form.

In another example, a bus system may be used to implement communications fabric 2202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 2206, or a cache, such as found in an interface and memory controller hub that may be present in communications fabric 2202.

The different illustrative embodiments can take the form of an entirely hardware embodiment, an entirely software embodiment, or an embodiment containing both hardware and software elements. Some embodiments are implemented in software, which includes but is not limited to forms such as, for example, firmware, resident software, and microcode.

Furthermore, the different embodiments can take the form of a computer program product accessible from a computer usable or computer readable medium providing program code for use by or in connection with a computer or any device or system that executes instructions. For the purposes of this disclosure, a computer usable or computer readable medium can generally be any tangible apparatus that can contain, store, communicate, propagate, or transport the program for use by or in connection with the instruction execution system, apparatus, or device.

The computer usable or computer readable medium can be, for example, without limitation an electronic, magnetic, optical, electromagnetic, infrared, or semiconductor system, or a propagation medium. Non-limiting examples of a computer readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W), and DVD.

Further, a computer usable or computer readable medium may contain or store a computer readable or computer usable program code such that when the computer readable or computer usable program code is executed on a computer, the execution of this computer readable or computer usable program code causes the computer to transmit another computer readable or computer usable program code over a communications link. This communications link may use a medium that is, for example without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example, without limitation, keyboards, touch screen displays, and pointing devices. Different communications adapters may also be coupled to the system to enable the data processing system to become coupled to other data processing systems, remote printers, or storage devices through intervening private or public networks. Non-limiting examples of modems and network adapters are just a few of the currently available types of communications adapters.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method implemented by a computer, the method comprising:
    displaying, on a tangible display device, a first set of dashboard pages via a web browser that displays a first pinboard comprising breadcrumbs represented as icons, wherein a first dashboard page includes a plurality of areas for serving different functions, and the first pinboard includes a pin icon and a separation bar with the breadcrumbs, breadcrumbs on one side of separation bar automatically change over time as a user or a data processing system creates the breadcrumbs over time, and breadcrumbs on other side of the separation bar are the breadcrumbs the user permanently pinned to the first pinboard;
    displaying, on the tangible display device, the first pinboard including at least a first breadcrumb located within a first area on the first dashboard page, wherein the first breadcrumb is a visual representation of a first person and points to a second set of dashboard pages associated with human resources data for the first person;
    receiving input from a user, via a tangible user input device, for selection of the first breadcrumb of the first person, displaying a different set of display areas, on the first dashboard page, providing the human resources data for the first person;
    receiving input from the user, via the tangible user input device, displaying a first pop-up window including a list of commands that can be performed with respect to the human resources data to which the first breadcrumb points, wherein the commands include at least pin command;
    receiving input from the user, via the tangible user input device, for selection of the pin command from the first pop-up window, displaying a second pop-up window including a list of additional pinboards to which the first breadcrumb may be placed, wherein each of the additional pinboards is associated with a corresponding one of a plurality of human resources actions; and
    receiving input from the user, via the tangible user input device, for selection of one of the list of additional pinboards from the second pop-up window, pinning the first breadcrumb of the first person to the selected pinboard and displaying the selected pinboard on the first dashboard page.

2. The method of claim 1, wherein performing the human resources action comprises dragging the first breadcrumb to a different position on the first pinboard relative to other breadcrumbs on the first pinboard.

3. The method of claim 1, wherein performing the human resources action further comprises:
    responsive to the selecting of the first breadcrumb of the first person, displaying personal and work information of the first person, and actions in relation to the human resources data to which the first breadcrumb points.

4. The method of claim 1 further comprising:
selecting a second breadcrumb on the first pinboard;
dragging the second breadcrumb onto the first breadcrumb on the first area of the dashboard page; and
adding data to which the second breadcrumb points to the first breadcrumb.

5. The method of claim 1, wherein a selected breadcrumb on the first area of the dashboard page indicates which page from the set of dashboard pages is currently selected.

6. The method of claim 1 further comprising:
displaying a plurality of additional breadcrumbs on the first area of the dashboard page; and
limiting a number of the plurality of additional breadcrumbs on the first area of the dashboard page displayed to a pre-determined number.

7. The method of claim 6 further comprising:
receiving a command to expand a number of breadcrumbs displayed on the first area of the dashboard page; and
displaying at least some of the number of plurality of additional breadcrumbs displayed on the first area of the dashboard page beyond the pre-determined number.

8. The method of claim 1 further comprising:
displaying both a second breadcrumb and a third breadcrumb on the first area of the first dashboard page of the first pinboard
receiving a command actuating the third breadcrumb;
responsive to receiving the command actuating the third breadcrumb, displaying a second dashboard page associated with the second breadcrumb, and automatically displaying a third dashboard page associated with the third breadcrumb in time, wherein displaying the second dashboard page and the third dashboard page appears to the user as a slide-show.

9. The method of claim 1 further comprising:
displaying the first dashboard page associated with the first breadcrumb;
receiving a command to change the first dashboard page to a different dashboard page; and
responsive to changing the first dashboard page, changing display of the first pinboard to highlight a second breadcrumb that appears on the first area of the first dashboard page on the first pinboard, the second breadcrumb associated with the different dashboard page.

10. The method of claim 1, wherein performing the human resources action comprises;
displaying on the tangible user input device an additional pinboard associated with the human resources action; and
deleting or hiding the first breadcrumb from the additional pinboard.

11. The method of claim 10, wherein deleting or hiding is accomplished by either of:
dragging the first breadcrumb away and off of the additional pinboard: or
right clicking on the first breadcrumb using a mouse as the tangible user input device, and selecting an option to delete or hide the first breadcrumb from the first area of the first dashboard page.

12. A computer comprising:
a processor;
a non-transitory computer readable storage medium in communication with the processor;
a display device in communication with the processor;
a tangible user input device in communication with the processor, wherein the processor configured to:
displaying, on a tangible display device, a first set of dashboard pages via a web browser that displays a first pinboard comprising breadcrumbs represented as icons, wherein a first dashboard page includes a plurality of areas for serving different functions, and the first pinboard includes a pin icon and a separation bar with the breadcrumbs, breadcrumbs on one side of separation bar automatically change over time as a user or a data processing system creates the breadcrumbs over time, and breadcrumbs on other side of the separation bar are the breadcrumbs the user permanently pinned to the first pinboard;
display, on the tangible display device, the first pinboard including at least a first breadcrumb located within a first area on the first dashboard page, wherein the first breadcrumb is a visual representation of a first person and points to a second set of dashboard pages associated with human resources data for the first person;
receive input from a user, via a tangible user input device, for selection of the first breadcrumb of the first person, display a different set of display areas, on the first dashboard page, providing the human resources data for the first person;
receive input from the user, via the tangible user input device, display a first pop-up window including a list of commands that can be performed with respect to the human resources data to which the first breadcrumb points, wherein the commands include at least pin command;
receive input from the user, via the tangible user input device, for selection of the pin command from the first pop-up window, display a second pop-up window including a list of additional pinboards to which the first breadcrumb may be placed, wherein each of the additional pinboards is associated with a corresponding one of a plurality of human resources actions; and
receive input from the user, via the tangible user input device, for selection of one of the list of additional pinboards from the second pop-up window, pin the first breadcrumb of the first person to the selected pinboard and displaying the selected pinboard on the first dashboard page.

13. A non-transitory computer readable storage medium storing computer usable program code which, when executed by a processor, performs a method implemented by a computer, the computer usable program code comprising:
computer usable program code for displaying, on a tangible display device, a first set of dashboard pages via a web browser that displays a first pinboard comprising breadcrumbs represented as icons, wherein a first dashboard page includes a plurality of areas for serving different functions, and the first pinboard includes a pin icon and a separation bar with the breadcrumbs, breadcrumbs on one side of separation bar automatically change over time as a user or a data processing system creates the breadcrumbs over time, and breadcrumbs on other side of the separation bar are the breadcrumbs the user permanently pinned to the first pinboard;
computer usable program code for displaying, on the tangible display device, the first pinboard including at least a first breadcrumb located within a first area on the first dashboard page, wherein the first breadcrumb is a visual representation of a first person and points to a second set of dashboard pages associated with human resources data for the first person;
computer usable program code for receiving input from a user, via a tangible user input device, for selection of the first breadcrumb of the first person, displaying a different set of display areas, on the first dashboard page, providing the human resources data for the first person;

computer usable program code for receiving input from the user, via the tangible user input device, displaying a first pop-up window including a list of commands that can be performed with respect to the human resources data to which the first breadcrumb points, wherein the commands include at least pin command;

computer usable program code for receiving input from the user, via the tangible user input device, for selection of the pin command from the first pop-up window, displaying a second pop-up window including a list of additional pinboards to which the first breadcrumb may be placed, wherein each of the additional pinboards is associated with a corresponding one of a plurality of human resources actions; and computer usable program code for receiving input from the user, via the tangible user input device, for selection of one of the list of additional pinboards from the second pop-up window, pinning the first breadcrumb of the first person to the selected pinboard and displaying the selected pinboard on the first dashboard page.

* * * * *